United States Patent
Fujii

(10) Patent No.: US 7,319,487 B2
(45) Date of Patent: Jan. 15, 2008

(54) FOCUSING APPARATUS, CAMERA AND FOCUS POSITION DETECTING METHOD

(75) Inventor: Naoki Fujii, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 907 days.

(21) Appl. No.: 10/407,155

(22) Filed: Apr. 4, 2003

(65) Prior Publication Data
US 2004/0036795 A1 Feb. 26, 2004

(30) Foreign Application Priority Data
Apr. 10, 2002 (JP) .............................. 2002-107936
Apr. 30, 2002 (JP) .............................. 2002-128752

(51) Int. Cl.
*H04N 5/232* (2006.01)
*G03B 13/00* (2006.01)
(52) U.S. Cl. ....................... 348/353; 348/354; 348/355
(58) Field of Classification Search ......... 348/345–356
See application file for complete search history.

(56) References Cited

U.S. PATENT DOCUMENTS 4,853,788 A * 8/1989 Murashima et al. ........ 348/355
5,003,339 A * 3/1991 Kikuchi et al. ............. 396/100
5,249,058 A * 9/1993 Murata et al. ............... 348/354
5,325,146 A * 6/1994 Toji ............................. 396/81
5,802,405 A * 9/1998 Sugimoto ..................... 396/82

FOREIGN PATENT DOCUMENTS

| JP | 3-64715 A | 3/1991 |
| JP | 05-103250 A | 4/1993 |
| JP | 06-062301 A | 3/1994 |
| JP | 2000-206403 A | 7/2000 |
| JP | 2001-281533 A | 10/2001 |

* cited by examiner

*Primary Examiner*—David Ometz
*Assistant Examiner*—Tuan Le
(74) *Attorney, Agent, or Firm*—Frishauf, Holtz, Goodman & Chick, P.C.

(57) ABSTRACT

A focusing apparatus includes a filter unit for performing frequency filtering processing on an image pickup signal, and a focus position detecting unit for detecting a focus position based on the contrast value of the image pickup signal having undergone the frequency filtering processing by the filter unit. The filter unit has a first filter for normal position detection, and a second filter for infinity position detection having a frequency characteristic different from that of the first filter, and selects the first filter or the second filter.

7 Claims, 32 Drawing Sheets

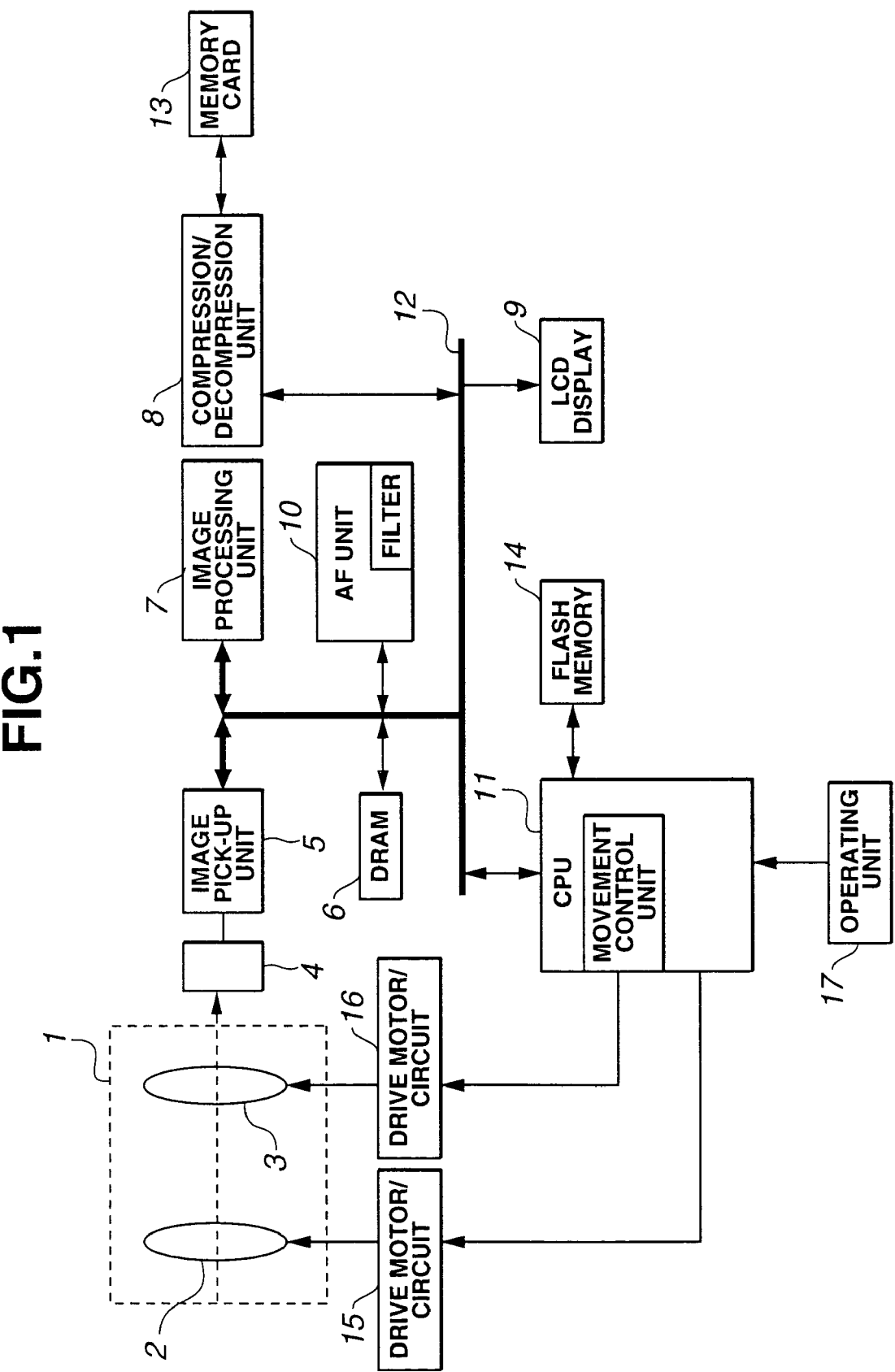

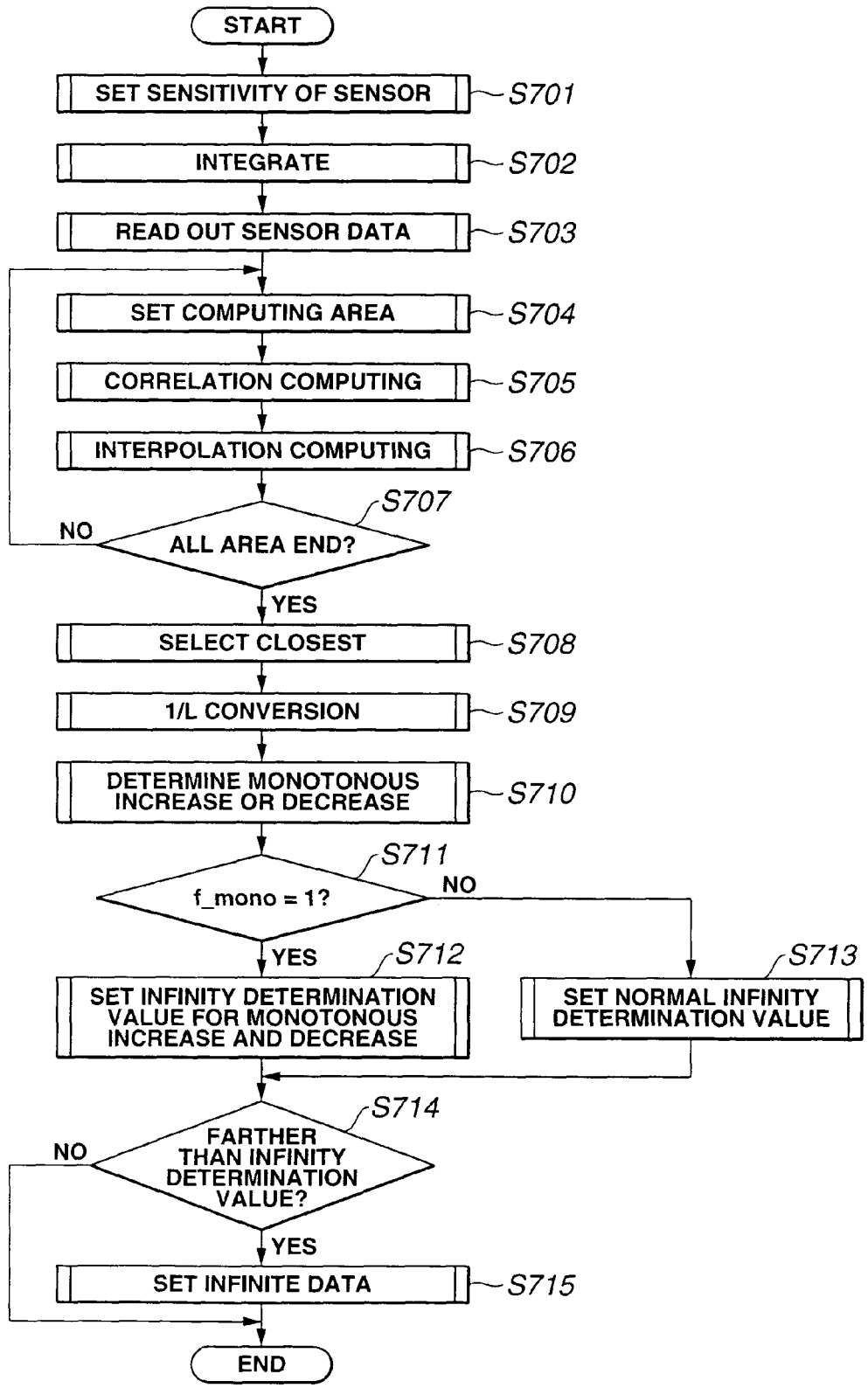

FIG.24C FIG.24D
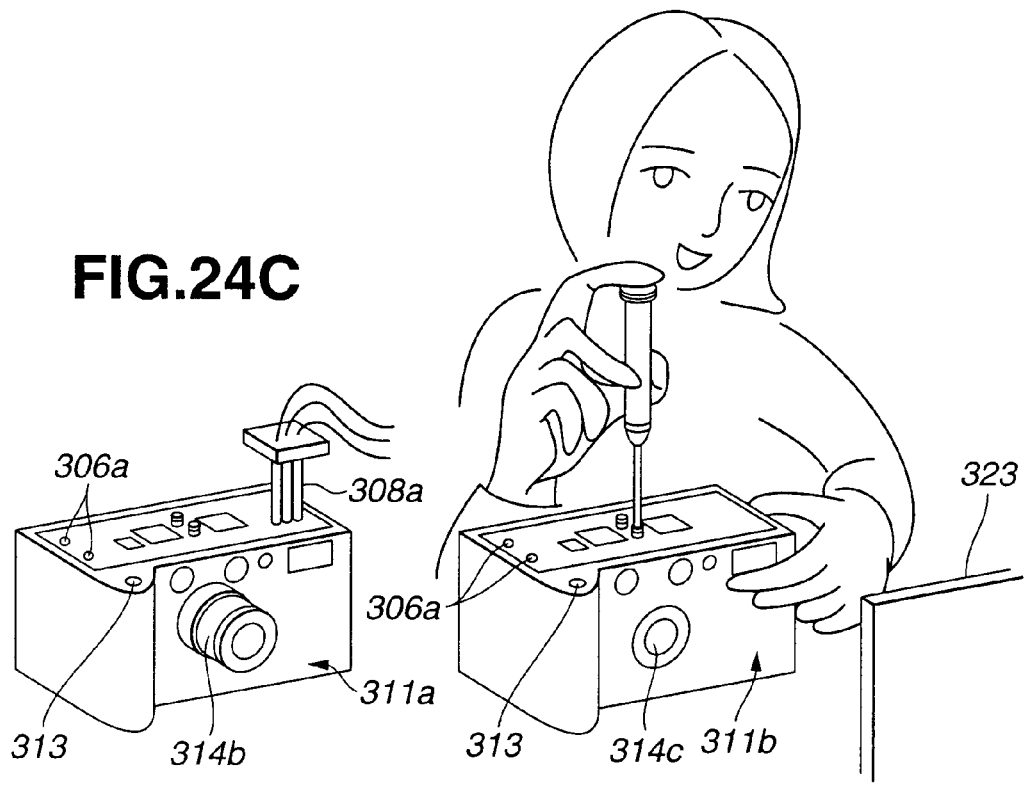

FIG.34A FIG.34B
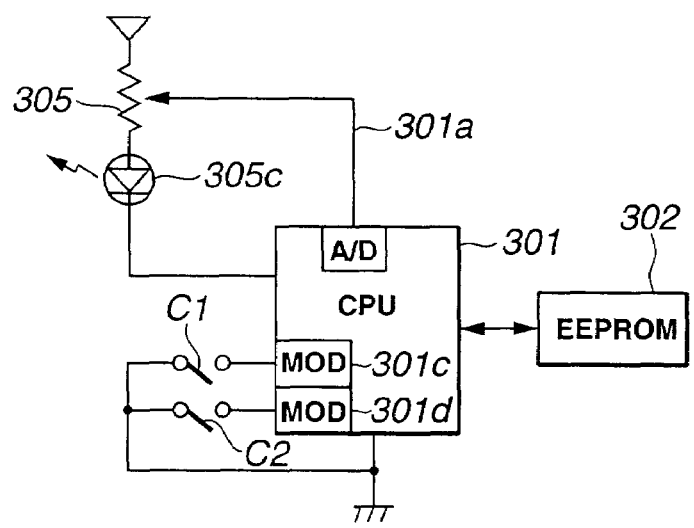
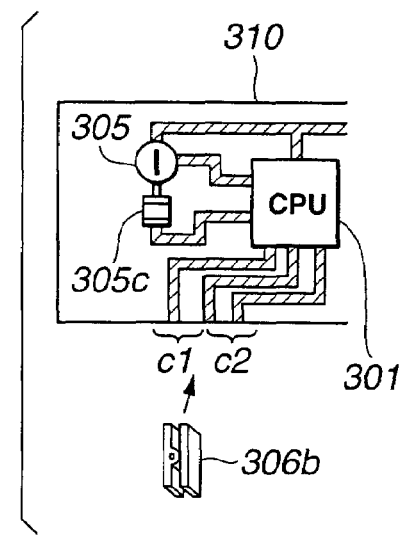

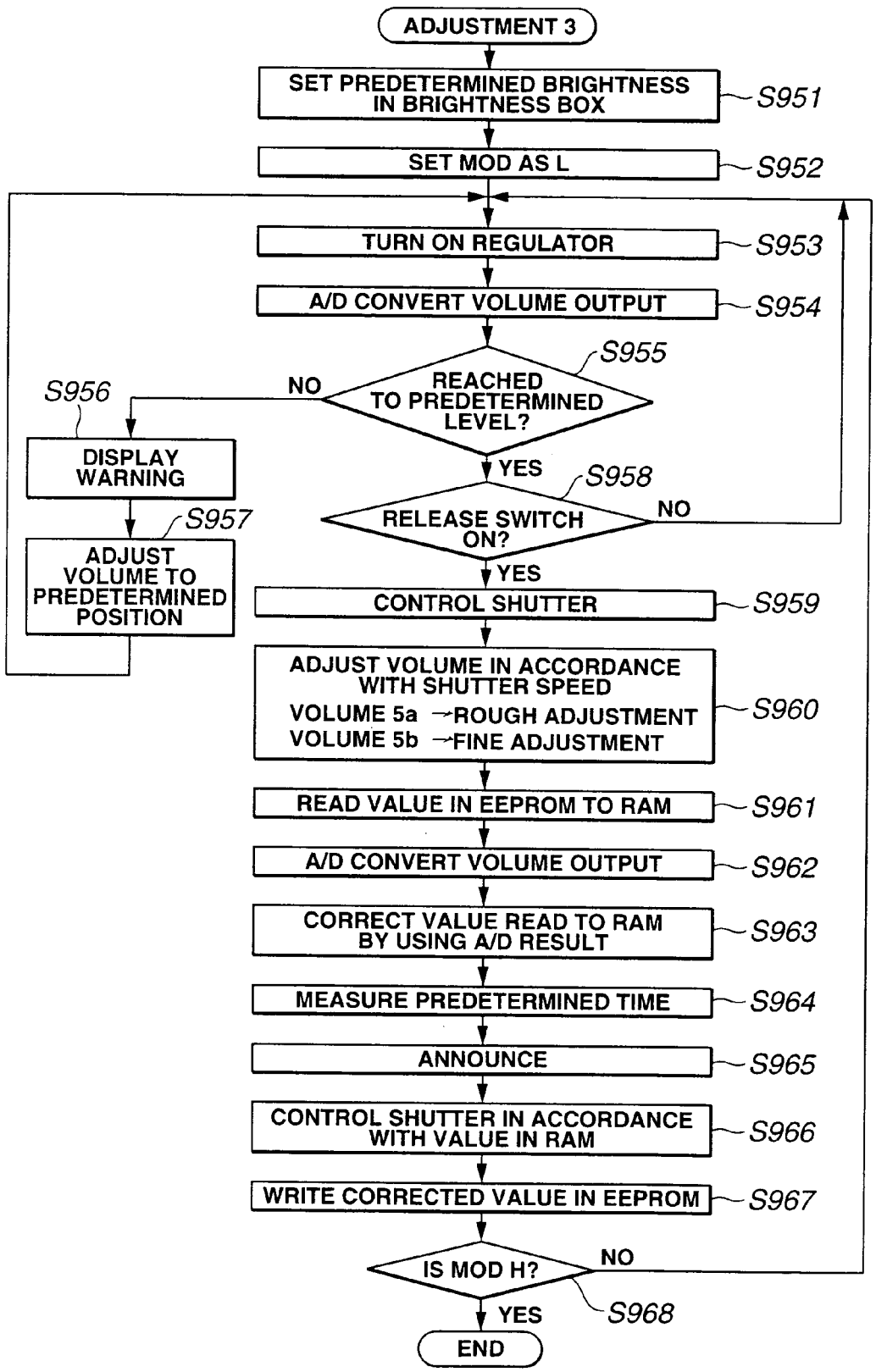

FOCUSING APPARATUS, CAMERA AND FOCUS POSITION DETECTING METHOD

This application claims the benefit of Japanese Application No. 2002-128752 filed on Apr. 30, 2002, No. 2002-156087 filed on May 29, 2002, and No. 2002-107936 filed on Apr. 10, 2002, the entire contents of which are incorporated herein by reference.

BACKGROUND OF THE INVENTION

1. Field of the Invention

The present invention relates to a distance measuring apparatus installed in a camera and the like. In particular, the present invention relates to a distance measuring apparatus for precisely measuring a distance at infinity.

2. Description of Related Art

An auto-focus (which may be simply called "AF" hereinafter) method is a method for a generally used focus adjustment means in a camera. The AF method includes various methods such as an active method, a passive method, and a contrast method. For example, for a digital camera, AF by the contrast method is generally adopted. Since, the AF method by the contrast method uses image pickup signals, parallax does not occur, and a special sensor for AF is not required, which are big advantages.

Conventionally, a distance measuring apparatus by an external light passive method, which may be adopted for a compact camera, forms an image of a pencil of light of an object on a pair of line sensors through a pair of photoreceptive lenses. Then, the distance measuring apparatus detects a spacing between subject images on the pair of line sensor based on pixel outputs of the respective pair of line sensors, and calculates a distance to the object in accordance with the triangulation principle based on the base line length (that is, the spacing of the pair of photoreceptive lenses).

The distance measuring apparatus moves focus lenses of a shooting lens of a camera based on the distance. The line sensor may be an array of photoreceptors, such as CMOS line sensors and a CCD (charge Coupled Device) line sensor.

As shown in FIG. 19, a photoreceptive portion of a distance measuring apparatus by the external light passive method includes a pair of photoreceptive lenses L1 and L2 and a pair of line sensors S1 and S2. Ideally, a line BL connecting light axes of the pair of photoreceptive lenses L1 and L2 and a line Bs connecting the centers of the pair of line sensors S1 and S2 are parallel after the assembly. However, in reality, due to the errors caused in the assembly and/or variations in parts, the line BL connecting the lens light axes and the line Bs connecting the centers of the sensors are not parallel and have an angle θ therebetween, as shown in FIG. 19.

FIGS. 20A to 20F are diagrams each showing an image-forming position on a line sensor in accordance with a subject pattern. FIG. 20A is a diagram showing an ascending-toward-right diagonal pattern subject. FIG. 20B is a diagram showing a vertical pattern subject. FIG. 20C is a diagram showing an ascending-toward-left diagonal pattern subject. FIG. 20D is a diagram showing image-forming positions of the ascending-toward-right diagonal pattern subject on the line sensors S1 and S2. FIG. 20E is a diagram showing image-forming positions of the vertical pattern subject on the line sensors S1 and S2. FIG. 20F is a diagram showing an image-forming position of the ascending-toward-left diagonal pattern subject on the line sensors S1 and S2. Here, FIGS. 20D to 20F are diagrams each showing a case where the line BL connecting the light axes of the pair of photoreceptive lenses L1 and L2 is not parallel with the line Bs connecting the centers of the pair of line sensors S1 and S2 and a rotational error θ occurs therebetween, as shown in FIG. 19. D1 indicates a distance between images P1 and P2 upon the ascending-toward-right diagonal pattern subject distance measurement in FIG. 20D. D2 indicates a distance between the images P1 and P2 upon the vertical pattern subject distance measurement in FIG. 20E. D3 indicates a distance between the objects P1 and P2 upon the ascending-toward-left diagonal pattern subject distance measurement in FIG. 20F.

With the distance measuring apparatus having the lines BL and Bs at the angle θ as shown in FIG. 19, the distance D between the images P1 and P2 formed on the pair of line sensors S1 and S2 varies from line D1 to D3 (D1>D2>D3) shown in FIGS. 20D to 20F, which results in a distance measurement error. This is due to the angle (see FIGS. 20A to 20C) of the pattern P for the objects, even though the objects keep the same distance.

For example, when a landscape is shot as shown in FIG. 7A, which will be described later, the distance between the images P1 and P2 are large as shown in D1 in FIG. 20D because the ridgeline of the mountain has the ascending-toward-right diagonal pattern. Therefore, the measured distance data may shift to the closer distance side, and the infinity may not occur.

In order to solve these problems, a technology as disclosed in Japanese Unexamined Patent Application Publication No. 2000-206403 is known. In this case, a line sensor S3 is located at a position shifted by h in a direction perpendicular to the base line length direction toward one line sensor S2 of the pair of line sensors S1 and S2 as shown in FIG. 21. Then, an angle Ψ of a pattern P of the object is calculated from a distance X of the pattern P2 of the objects formed on the line sensors S2 and S3. Then, a distance D between the images P1 and P2 is corrected based on the angle Ψ and the angle θ (see FIG. 19) formed by the lines BL and Bs.

Furthermore, the applicant proposes, in Japanese Unexamined Patent Publication No. 3-64715, a technology relating to highly precise auto-focus camera effectively using an EEPROM on which various data can be written electrically.

The camera disclosed in Japanese Unexamined Patent Publication No. 3-64715 requires a dedicated checker, which is caused to communicate with a microcomputer so as to easily adjust correction data written in the EEPROM. Furthermore, the commonality of parts tends to be required for reducing the costs. When an electronic circuit including the microcomputer and the EEPROM is implemented on a printed circuit board, the mass production of the parts at one place can minimize the costs. In this case, the effect of the adoption of the checker may be large.

SUMMARY OF THE INVENTION

A focusing apparatus according to the invention includes filter means for performing frequency filtering processing on an image pickup signal, and focus position detecting means for detecting a focus position based on the contrast value of the image pickup signal having undergone the frequency filtering processing by the filter means. In this case, the filter means has a first filter for normal position detection, a second filter for infinity position detection having a frequency characteristic different from that of the first filter, and a select portion for selecting the first filter or the second filter for performing the frequency filtering processing.

BRIEF DESCRIPTION OF THE DRAWINGS

FIG. 1 is a block diagram showing a construction example of an electronic camera according to a first embodiment of the invention;

FIG. 14A is a diagram showing an example of a chart having a −45° pattern;

FIG. 14B is a diagram showing an example of a chart having a +45° pattern;

FIG. 17 is a flowchart showing a distance measuring sequence according to the third embodiment of the invention;

FIGS. 22 to 33 relate to a fifth embodiment of the invention;

FIG. 22 is a block circuit diagram showing an electric construction of a printed circuit board for an electronic circuit of a camera according to the fifth embodiment;

FIG. 24C is a diagram showing a state where a camera having a zoom lens with a large zoom rage is adjusted when the camera is manufactured or is repaired;

FIG. 24D is a diagram showing a state where a camera having a large depth of field of fixed focal length is adjusted when the camera is manufactured or is repaired;

FIG. 25 is a diagram showing a flowchart for explaining a flow of a check operation on a circuit or an element implemented on a printed circuit board for an electronic circuit;

FIG. 26 is a diagram for explaining a circuit especially for distance measurement of an AF apparatus of a camera;

FIG. 28 is a diagram showing a flowchart showing a flow of an operation for correcting, by using correction data written in an EEPROM, an error in shooting due to an error in manufacturing the camera;

FIG. 29 is a construction diagram of an adjustment device for adjusting data written in EEPROM by using a checker;

FIG. 30 is a diagram showing a flowchart for explaining a flow of an operation for adjusting correction data written in an EEPROM by using the checker;

FIG. 31 is a diagram showing the first half of a flowchart for explaining a flow of an operation for manually adjusting correction data written in an EEPROM;

FIG. 32 is a diagram showing the second half of the flowchart for explaining the flow of the operation for manually adjusting correction data written in the EEPROM;

FIG. 33 is a diagram showing a flowchart for explaining the control over a main operation of the camera according to the fifth embodiment of the invention;

FIG. 34A is a construction diagram relating to a printed circuit board for an electronic circuit of a camera according to a sixth embodiment of the invention;

FIG. 34B is a diagram for explaining switching of a switch on the printed circuit board for the electronic circuit of the camera according to the sixth embodiment;

FIG. 37 is a diagram showing a flowchart for explaining a flow of an operation for adjusting an exposure control circuit manually;

DETAILED DESCRIPTION OF PREFERRED EMBODIMENTS

Figure 2A:
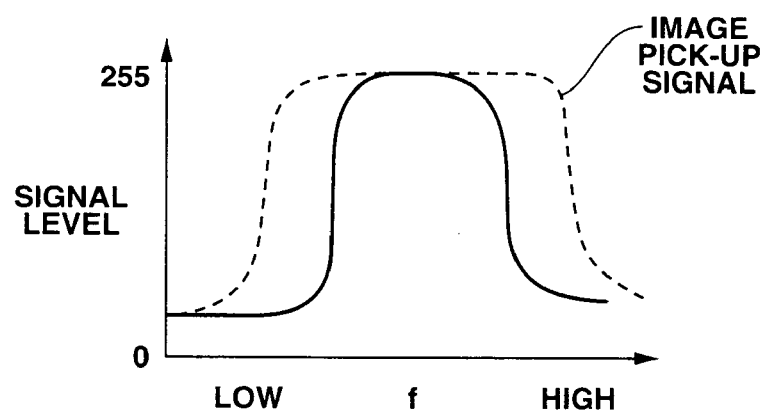
FIG. 2A is a diagram showing an example of a frequency characteristic of filter means for normal position detection.

Embodiments of the invention will be described below with reference to drawings.

First Embodiment

FIG. 1 is a construction example of an electronic camera according to a first embodiment of the invention.

In FIG. 1, a shooting lens portion 1 includes a zoom lens 2 and focus lens 3, which are zoom optical means, and forms an image of a subject onto an image pickup element 4. The shooting lens portion 1 is arranged to change a focus position of the focus lens 3 in accordance with the focus distance with respect to a subject at infinity.

The image pickup element 4 is a charge-coupled device (CCD), for example. The image pickup element 4 photo-electronically converts a subject image formed on the image pickup element 4 by an operation by the shooting lens portion 1 and outputs analog electric signals expressing the image.

An image pickup unit 5 includes a correlated double sampling (CDS) for reducing a noise component, an automatic gain control (AGC) for adjusting a signal level and an A/D for converting analog electric signals to digital electric signals. The image pickup unit 5 reduces a noise component of an analog electric signal output from the image pickup element 4, adjusts a signal level and converts and outputs it to a digital electric signal.

All of the image pickup unit 5, a DRAM 6, an image processing unit 7, a compression/decompression unit 8, an LCD display 9 for image display, an AF unit 10 and a CPU 11 are connected to a bus 12 and can exchange data with each other.

The dynamic random access memory (DRAM) 6 is a memory to be used for temporarily storing image data, which is digital electric signals output from the image pickup unit 5, or image data during various kinds of image processing by the image processing unit 7, or used for a work area, for example, for performing control processing by the CPU 11.

The image processing unit 7 performs various kinds of correction processing such as gamma correction and white balance correction to be performed when image data is recorded. Furthermore, the image processing unit 7 performs various kinds of image processing such as image enlarging/reducing processing (resize processing) for increasing or decreasing a number of pixies included in an image.

The compression/decompression unit 8 performs compression/decompression processing on image data by Joint Photographic Experts Group (JPEG) method for recording or reconstructing image data.

The memory card 13 is a recording medium attached to the electronic camera removably. The memory card 13 records and stores image data expressing an image shot by the electronic camera. The memory card 13 is connected to the compression/decompression unit 8 through a card I/F, not shown.

The LCD display 9 displays a shot image expressed by image data and/or various menus. The LCD display 9 is connected to the bus 12 through an LCD driver, not shown.

The AF unit 10 extracts an image pickup signal of a partial area of a screen from image pickup signals based on output signals of the image pickup element 4 and performs frequency filter processing on a spatial frequency of the extracted image pickup signal. Then, the AF unit 10 detects a focus position based on the contrast value of the image pickup signal having undergone the frequency filter processing. In this case, the AF unit 10 includes filter means for normal position detection and filter means for infinity position detection as means for performing the frequency filter processing. In order to perform frequency filter processing, the AF unit 10 selects one of the filter means and performs the frequency filter processing by using the selected filter means. The filter means for infinity position detection has a frequency characteristic for passing a high frequency component of an image pickup signal more than the filter means for normal position detection.

The CPU 11 is a central processing unit and executes a camera program stored in a flash memory 14 so as to control operation of the entire digital camera. For example, the CPU 11 performs drive control of the focus lens 3 based on the focus position calculated by the AF unit 10 and/or drive control of the zoom lens 2 in accordance with the pressing of a zoom-button, which will be described later.

The flash memory 14 is a non-volatile memory, which can be electrically rewritten. The flash memory 14 stores a camera program executed by the CPU 11 and also, various kinds of data to be used during the execution of the camera program such as a focus position (infinity position data) corresponding to a subject at infinity calculated by the AF unit 10, for example.

A drive motor/circuit portion 15 rotates a drive motor for zooming in accordance with the pulse value output from the CPU 11 and drives the zoom lens 2.

A drive motor/circuit portion 16 rotates a drive motor for focusing in accordance with the pulse value output from the CPU 11 and drives the focus lens 3.

The drive motor for zooming and the drive motor for focusing may be stepping motors, for example.

The operating means 17 has various buttons and the like for receiving various instructions from a shooting person and notifies the instructions to the CPU 11. For example, the operating means 17 includes a release button for enabling a shooting preparation instruction and a shooting start instruction, an infinity detection button for enabling an instruction for detecting a focus position with respect to an object at infinity, an infinity movement button for enabling an instruction for moving the focus lens 3 and the like to a position corresponding to an object at infinity, and a zoom button for enabling an instruction for setting a zoom rate (tele or wide).

Subsequently, a difference in frequency characteristic between the filter means for normal position detection and the filter means for infinity position detection will be described.

Figure 2B:
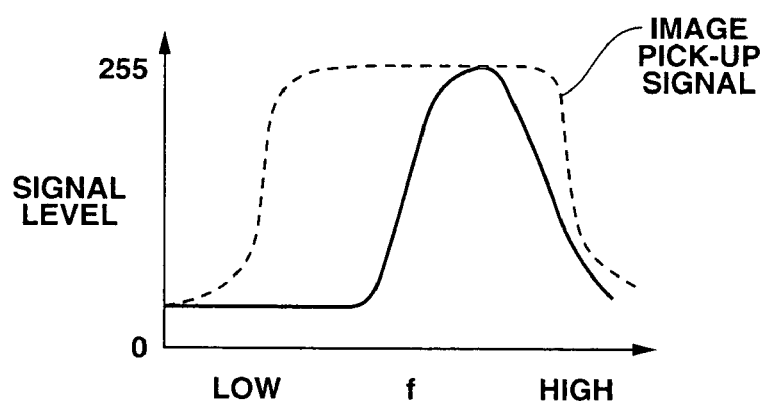
FIG. 2B is a diagram, showing an example of a frequency characteristic of filter means for infinity position detection.

FIG. 2A is a diagram showing a frequency characteristic of the filter means for normal position detection, and FIG. 2B is a diagram showing a frequency characteristic of the filter means for infinity position detection. In FIGS. 2A and 2B, the vertical axis indicates signal levels 0 to 255 of quantized image pickup signals, and the horizontal axis indicates a spatial frequency f. The dotted line indicates a spatial frequency distribution of image pickup signals before filter processing on a general object. The solid line indicates a spatial frequency distribution of image pickup signals after filter processing on the image pickup signals indicated by the dotted line.

As shown in FIG. 2A, the filter means for normal position detection has a frequency characteristic to cut a low frequency component and high frequency component of an image pickup signal and extract the other frequency component.

On the other hand, as shown in FIG. 2B, the filter means for infinity position detection has a frequency characteristic for passing a high frequency component of an image pickup signal more than the filter means for normal position detection does, that is, a frequency characteristic only having a high frequency component of an image pickup signal pass more. Generally, size of an object is decreased relatively to the shot area size as the distance with respect to the object increases. The spaces of patterns and light-and-shade are also decreased in proportion. Therefore, the proportion of the high frequency component is increased in the entire spatial frequency. Therefore, a focus on a far subject such as at infinity may be detected more effectively when the high frequency component of the picked-up image is used. In this case, by performing frequency filter processing by the filter means for infinity position detection, highly precise focus adjustment can be performed on the subject at infinity.

Next, the control processing to be performed by the CPU 11 of the digital camera will be described. The control processing is implemented when the CPU 11 reads and executes a camera program stored in the flash memory 14.

First of all, focus position detecting processing executed as a part of the control processing upon pressing of the infinity detection button will be described. The focus position detecting processing detects a focus position on an object at infinity in a predetermined focal distance and stores the focus position and the focal distance at that time.

Figure 3:
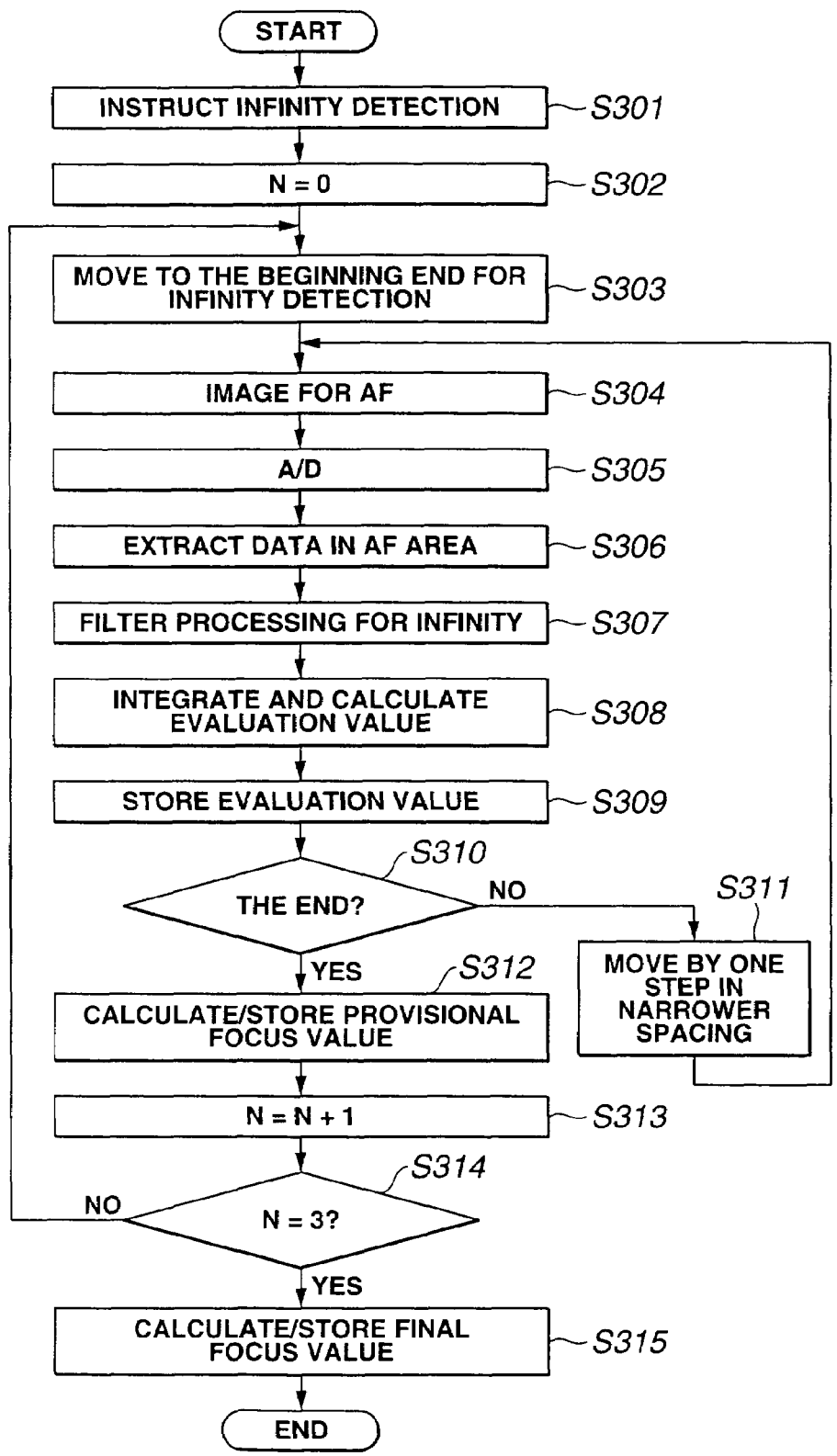
FIG. 3 is a flowchart showing an example of focus position detection processing when an infinity detection button is pressed according to the first embodiment.

FIG. 3 is a flowchart showing an example of the focus position detecting processing when the infinity detection button is pressed.

In FIG. 3, first of all at a step S301, the infinity detection button is pressed, and the detection of a focus position on an object at infinity is instructed.

At a step S302, a counter value N is reset to zero (0). The counter value N is a value incremented every time one provisional focus value, which will be described later, is calculated and is stored.

At a step S303, the focus lens 3 is moved to the leading edge position in a vicinity range (range, which may include an infinity position) of the focus position including a focus position corresponding to the object at infinity. The leading edge position is a position, which is stored during the manufacture as a focus position corresponding to the object of 10 m distance. The vicinity range of the focus position including the focus position corresponding to the object at infinity is simply called hereafter vicinity range of a focus position corresponding to an object at infinity.

At a step S304, the image pickup processing for the AF processing is performed. In other words, a subject image being formed on the image pickup element 4 is captured, and analog electric signals corresponding to the object are obtained. However, since this step is the image pickup processing for the AF processing, the data amount of the analog electric signals is reduced by performing thin-out processing.

At a step S305, A/D conversion processing is performed on the analog electric signals having been obtained at the previous step, and image pickup signals, which are digital electric signals, can be obtained.

At a step S306, image pickup signals within the range set as an AF area are extracted from the image pickup signals having obtained at the previous step.

At a step S307, the filter means for infinity position detection is selected as means for performing frequency filter processing. Then, the frequency filter processing is performed on the image pickup signals extracted at the previous step by the filter means, and the high frequency component of the image pickup signals is extracted.

At a step S308, brightness values (contrast values) of pixels of image pickup signals having undergone the frequency filter processing at the previous step are integrated, and the integrated value is calculated as an evaluation value.

At a step S309, the evaluation value having calculated at the previous step and the position of the focus lens 3 at that time are stored in the DRAM 6.

At a step S310, whether or not the position of the focus lens 3 at that time is at a trailing edge position of the vicinity range of the focus position corresponding to the object at infinity is determined. If the determination result is Yes, the processing goes to a step S312. If No, the processing goes to a step S311. The trailing edge position is a position away toward the farther direction from the position stored as the focus position corresponding to the infinity position during the manufacture.

At the step S311, the focus lens 3 is moved by a positional interval corresponding to one step. The positional interval corresponding to one step at this step is set smaller than the positional interval corresponding to one step in AF processing in the normal shooting processing, which will be described later. As described above, since the amount of a high frequency component of the spatial frequency of a shoot image is increased as the distance to an object increases, the contrast change in accordance with the amount of movement of the focus lens 3 becomes more significant when the distance to the object increases. Therefore, when a focus detection on an object at infinity is performed, the focus lens 3 is moved by smaller positional intervals than that at the normal distance so as to achieve highly precise focus adjustment.

When the step S311 ends, the processing returns to the step S304. Then, the above-described processing is repeated.

Thus, the evaluation value is calculated and is stored every movement of the focus lens 3 by one step from the leading edge position to the trailing edge position of the vicinity range of the focus position corresponding to an object at infinity.

At a step S312, the maximum evaluation value is calculated from evaluation values stored in this way, and the position of the focus lens 3 corresponding to the maximum evaluation value is read out from the DRAM 6. Then, the position is stored in the DRAM 6 as the provisional focus value.

At a step S313, the counter value N is incremented.

At a step S314, whether the counter value N is 3 or not is determined. If the determination result is Yes, the processing goes to a step S315. If No, the processing returns to the step S303, and the above-described processing is repeated. Thus, three provisional focus values are stored in the DRAM 6.

At the step S315, a final focus value is calculated from an average of the stored three provisional focus values. Thus, more precise focus value can be obtained. Then, the final focus value and the focal distance at that time are stored in the flash memory 14, and the flow ends.

By performing the above-described focus position detection processing, the focus value (final focus value) on an object at infinity in a focal distance when the infinity detection button is pressed is obtained, and the focus value is stored in the flash memory 14 together with the focal distance at that time.

Therefore, for example, a camera is pointed at an object at infinity (such as a mountain and a building) and a shooting person presses the zoom button to move the zoom lens 2 for obtaining an intended angle of view and presses the infinity detection button so that the focus value on the object at infinity in the focal distance at that time and the focal distance can be stored in the flash memory 14. Furthermore, for example, even when the focal position corresponding to an object at infinity in design such as an indicator at infinity is displaced due to the time-change, the precise focal position corresponding to the object at infinity can be obtained anytime.

In the above-described focus position detection processing, the movement from the leading edge position to the trailing edge position of the vicinity range of the focus position corresponding to an object at infinity is repeated three times, and a provisional focus value is calculated for each movement, and the final focus value is calculated from the average of the three provisional focus values in total. However, the number of times of repeating the movement is not limited to three. Furthermore, a provisional focus value does not have to be calculated for each movement. A provisional focus value may be calculated for an every few times, and the final focus value may be calculated from the multiple provisional focus values.

Next, shooting processing when the release button is pressed after the infinity movement button is pressed will be described. The shooting processing is performed as a part of control processing by the CPU 11. This processing is processing for shooting an object at infinity based on a focus position and focal distance on the object at infinity stored in the flash memory 14.

Figure 4:
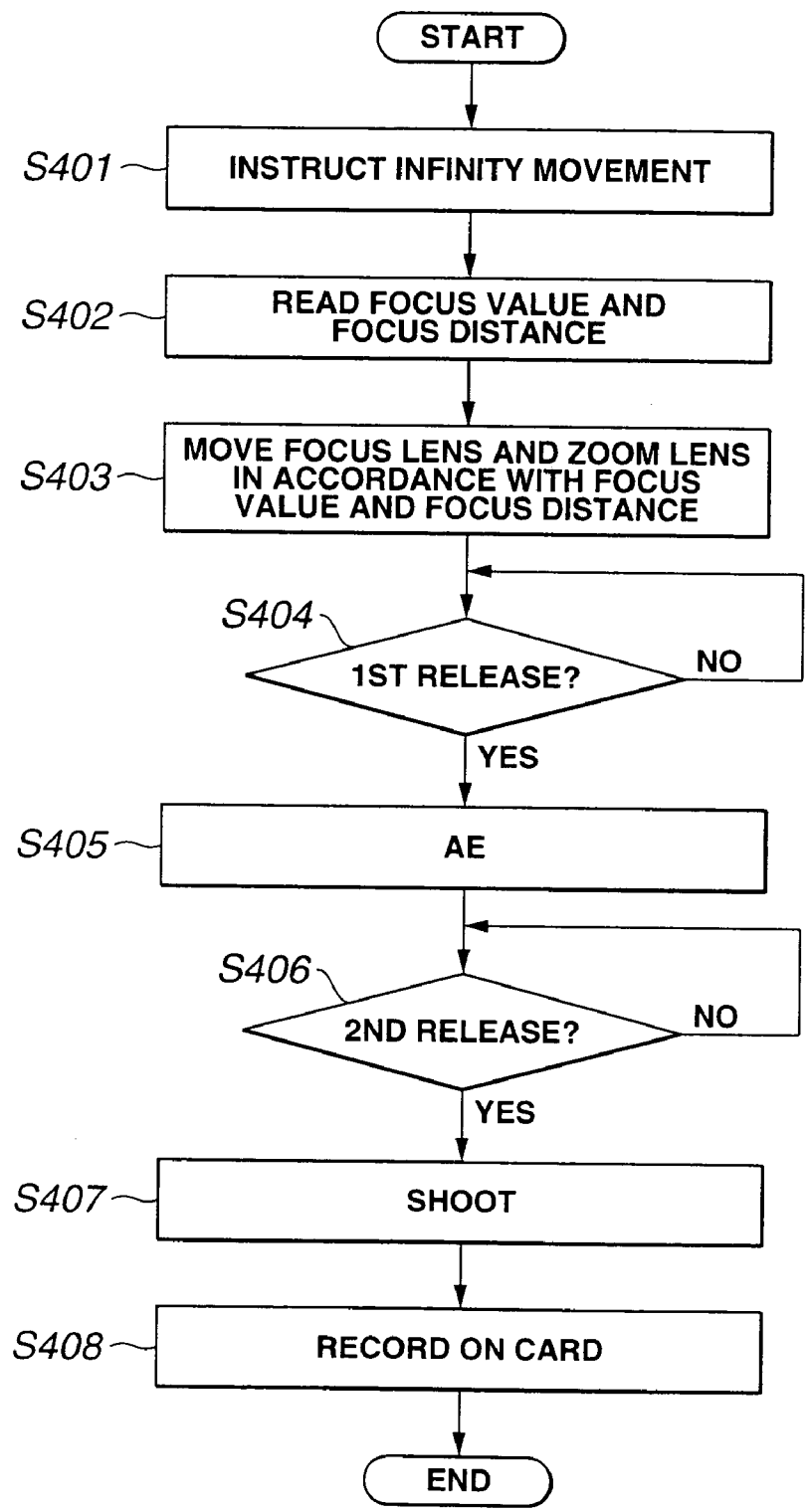
FIG. 4 is a flowchart showing an example of shooting processing when a release button is pressed after an infinity movement button is pressed according to the first embodiment.

FIG. 4 is a flowchart showing an example of the shooting processing when the release button is pressed after the infinity movement button is pressed.

In FIG. 4, first of all at a step S401, the infinity movement button is pressed, and an instruction is given for moving the focus lens 3, for example, to the position corresponding to the object at infinity.

At a step S402, the focus value and focal distance stored in the flash memory 14 by the step S315 are read out.

At a step S403, the focus lens 3 and the zoom lens 2 are moved based on the focus value and focal distance read by the previous step. In other words, the focus lens 3 is moved to the position corresponding to the focus value, and the zoom lens 2 is moved to the position corresponding to the focal distance.

At a step S404, whether or not the release button is pressed to a 1st release position to give a shooting preparation instruction is determined. If the determination result is Yes, the processing goes to a step S405. If No, this step is repeated.

At the step S405, AE processing (auto exposure processing) is performed. In the AE processing, an image of a subject is captured, and the brightness of the object is measured based on the image pickup signal obtained by the image capturing. Then, a proper exposure is calculated based on the measured value. The brightness of an object may be measured by using a dedicated sensor such as a light measuring sensor.

At a step S406, whether or not the release button is pressed to a 2nd release position to give a shooting start instruction is determined. If the determination result is Yes, the processing goes to a step S407. If No, this step is repeated.

At the step S407, actual shooting processing is performed under shooting conditions relating to an iris and/or a shutter speed in accordance with the proper exposure calculated by the AE processing at the step S405. In other words, a subject image formed on the image pickup element 4 is captured under the shooting conditions, and the processing such as A/D conversion by the image pickup unit 5, various image processing by the image processing unit 7 and the compression processing by the compression/decompression unit 8 are performed, and image data compliant with the format to record into the memory card 13 can be obtained.

At a step S408, the image data having being obtained at the previous step is recorded in the memory card 13, and this flow ends.

By performing the above-described shooting processing, based on the focus value and focal distance stored in the flash memory 14 by the focus position detection processing, an object at infinity in the focal distance can be shot.

Thus, a shooting person may press the infinity detection button in advance and stores a focus value on an object at infinity and the focal distance at that time may be stored. Thus, when the object at infinity in the focal distance is shot after that, the shooting person may only press the infinity movement button so as to move the zoom lens 2 to the position corresponding to the focal distance. Furthermore, the focal lens 3 may be moved to the position corresponding to the focus value. Therefore, the highly precise focal adjustment can be achieved.

For example, in order to accurately focus on a celestial object in a predetermined focal distance during nighttime, the focal distance may be set by pressing the zoom button for some object far enough to be infinity during daytime. By pressing the infinity detection button, the focus value on the object at infinity in the focal distance and the focal distance may be stored. During nighttime, the infinity movement button may be pressed. Thus, the highly precise focal adjustment can be achieved with respect to the celestial object during nighttime.

The zoom lens 3 is automatically moved to the position corresponding to the focal distance stored in the flash memory 14 at the step S403. However, a focal distance instruction means may be provided in the electronic camera for instructing such that the zoom lens 2 can be moved to the position corresponding to the focal distance. Then, a shooting person may press the zoom button in accordance with the instruction to move the zoom lens 3 manually to the position corresponding to the focal distance. The focal distance instruction means gives the instruction by lighting up the LED, for example.

In the shooting processing, when the infinity movement button is pressed, in accordance with the focus value and focal distance stored in the flash memory 14, the focus lens 3 and the zoom lens 2 are moved without exception to the position corresponding to an object at infinity in the focal distance. However, the focal adjustment may need to be performed on the subject at infinity in a focal distance different from the focal distance when the infinity detection button is pressed. In this case, for example, in the above-described shooting processing, when the infinity movement button is pressed, the focus value on the object at infinity in the focal distance to be shot may be calculated based on the focus value and focal distance stored in the flash memory 14. Then, the focus lens 3 may be moved to the position corresponding to the focal value.

In this embodiment, the focal position detecting processing and the shooting processing have been described as separate processing, but both of the processing may be performed in series. In other words, after the step S315 ends, the step S402 and the subsequent steps may be performed.

Next, normal shooting processing will be described, which is a part of the control processing by the CPU 11.

Figure 5A:
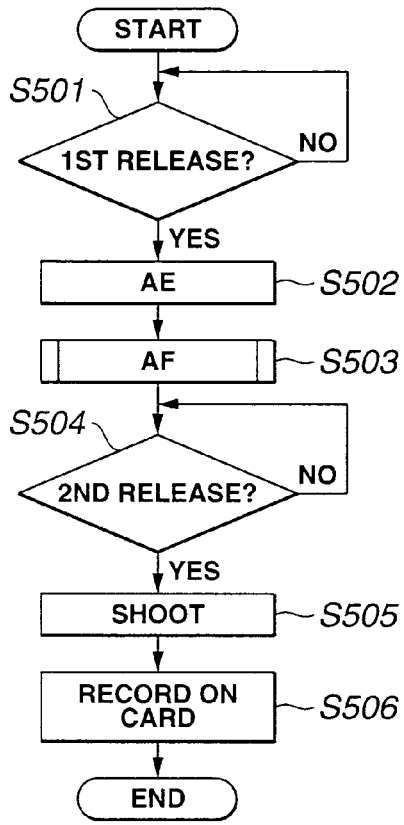
FIG. 5A is a flowchart showing an example of normal shooting processing according to the first embodiment.
Figure 5B:
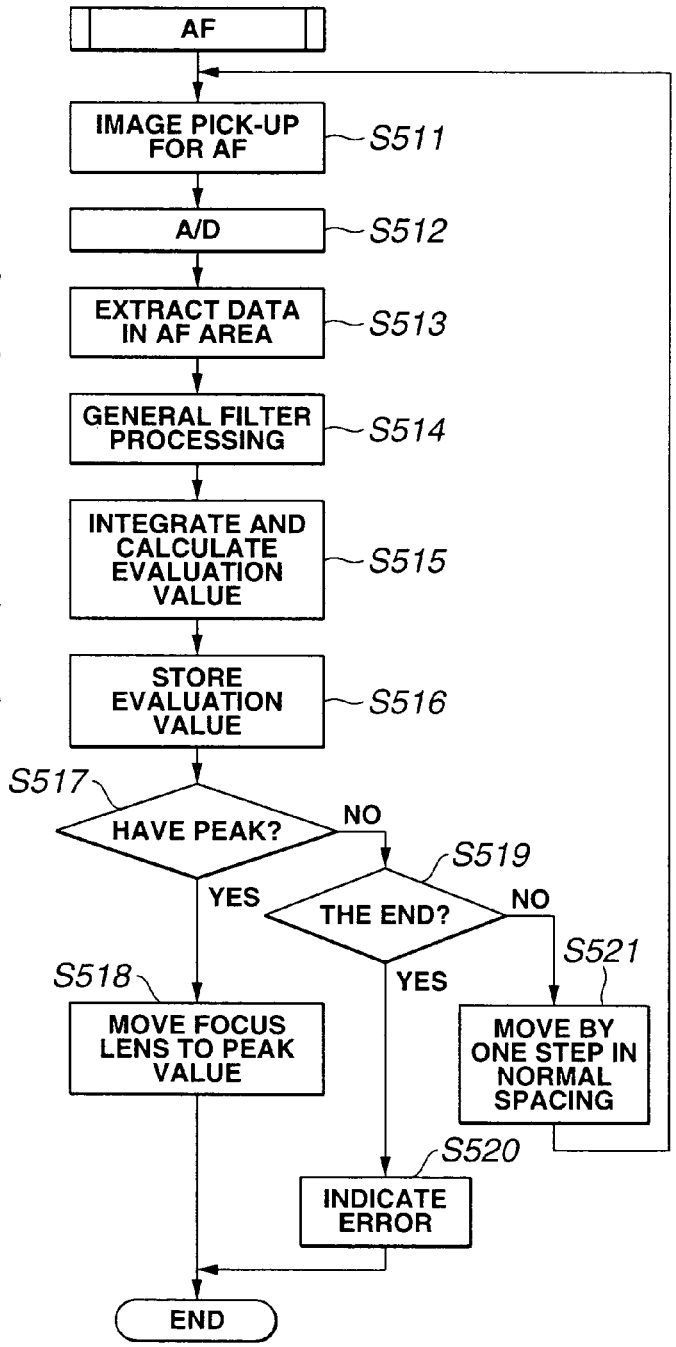
FIG. 5B is a flowchart showing an example of AF processing in the normal shooting processing (FIG. 5A)

FIGS. 5A and 5B are flowchart showing an example of the normal shooting processing.

In FIG. 5A, the steps S501 and S502 are performed in the same manner as the steps S404 and S405.

At a step S503, AF processing is performed, which will be described later, and the focus position is detected. thus, the focus lens 3 is moved to the focus position.

The steps S504 to S506 are performed in the same manner as the steps S406 to S408. Then, this flow ends.

Next, the AF processing at the step S503 will be described with reference to FIG. 5B.

In FIG. 5B, the steps S511 to S513 are performed in the same manner as the steps S304 to S306.

At a step S514, the filter means for normal position detection is selected as the means for performing the frequency filter processing. The filter means performs frequency filter processing on image pickup signals obtained by the previous step, and the low frequency component and high frequency component of the image pickup signals are cut.

The steps S515 and S516 are performed in the same manner as the steps S308 and S309.

At a step S517, the evaluation value stored by the previous step and the evaluation value stored last time are compared, and whether a certain or larger amount of difference exists or not is determined. If the determination result is Yes, the processing goes to a step S518. If No, the processing goes to a step S519. In the determination processing, when a certain or larger amount of different exists between the evaluation values, the presence of contrast peak is determined. Then, the focus position is detected.

At the step S518, the focus lens 3 is moved to the position where the contrast peak can be obtained, and this flow returns.

At the step S519, whether the focus lens 3 is at the trailing edge position of the range of the focus lens 3 movement or not is determined. If the determination result is Yes, the processing goes to a step S520. If No, the processing goes to a step S521.

At the step S520, an error indication is performed. For example, a fact that a focus position has not been detected because the contrast peak could not be found is displayed on the LCD display 9 as the error indication.

At the step S521, the focus lens 3 is moved by a normal positional interval corresponding to one step, and the processing returns to the step S511. Then, the above-described processing is repeated.

Thus, the shooting and the movement of the focus lens 3 are repeated until the determination of the presence of the contrast peak or until the focus lens 3 is moved to the trailing edge position.

By performing the above-described normal shooting processing, the filter means for normal position detection is selected in the AF processing. Then, the selected filter means performs the frequency filter processing on image pickup signals. Thus, the detection of the focus position is performed and the shooting is performed based on the contrast value of the image pickup signal having undergone the frequency filter processing.

In the AF processing in the normal shooting processing, the processing proceeds while detecting the contrast peak. Therefore, the normal positional interval corresponding to one step is set to be equal to a proper amount of movement of the focus lens 3 in view of the reduction in AF processing time and the improvement in AF precision.

In the above-described embodiment, the focus value on an object at infinity in a focal distance, which can be set by a shooting person easily to the wide end or to the tele end, may be detected in advance and be stored in the flash memory 14 when shipped. Then, when a shooting person may press the zoom button to move the zoom lens 2 to the wide end or to the tele end, the infinity movement button is pressed to read out, the corresponding focus value from the flash memory 14, and the focus lens 3 may be moved to the position corresponding to the focus value.

Furthermore, the optical construction of the shooting lens portion 1 in this embodiment, the focus position of the focus lens 3 may be prevented from changing in accordance with the focal distance to an object at infinity. However, in this case, the focal distance is not stored in the flash memory 14, and only the focus value is stored. Also, when the shooting lens portion 1 has a unifocal construction without the zoom lens 3, only the focus value is stored similarly.

In this embodiment, when the focus drive motor is a stepping motor, the microstep drive control method may be applied as the drive control method for adjusting the drive control angle in detail.

The electronic camera according to this embodiment includes a filter means for performing frequency filter processing on image pickup signals and a focusing apparatus for detecting a focus position based on the contrast value of the image pickup signals having undergone the frequency filter processing by the filter means.

The electronic camera according to this embodiment includes a focusing apparatus for moving a focal position by a predetermined position distance, obtaining image pickup signals at focal positions, and detecting a focus position based on the contrast value of the obtained image pickup signal.

While an electronical camera is applied as an example of a camera in this embodiment, a silver salt camera, a video camera, a camera incorporated in a mobile telephone or the like may be applied as an example.

As described above in detail, highly precise focal adjustment is achieved with respect to an object at infinity according to this embodiment.

Second Embodiment

Figure 6:
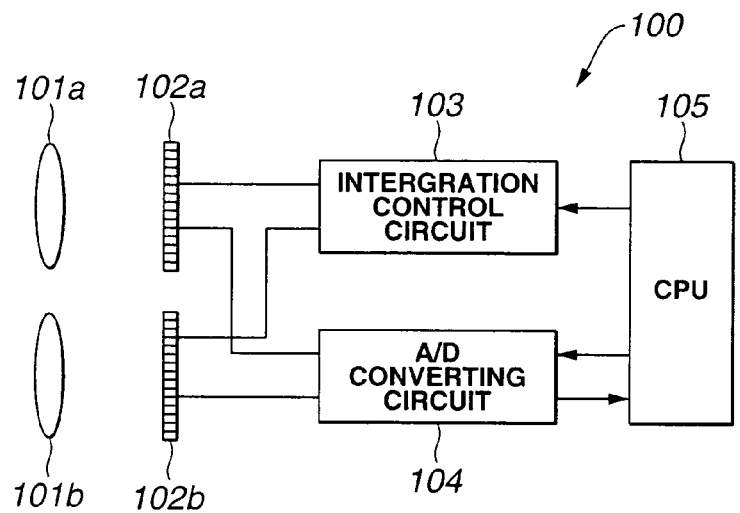
FIG. 6 is a block diagram showing a construction of a distance measuring apparatus according to a second embodiment of the invention.

FIG. 6 is a block diagram showing a construction of a distance measuring apparatus according to a second embodiment of the invention.

In FIG. 6, a distance measuring apparatus 100 includes a pair of photoreceptive lenses 101a and 101b for forming an image of an object on line sensors 102a and 102b, the pair of line sensors 102a and 102b for photoelectrically converting the object image formed by the photoreceptive lenses 101a and 101b in accordance with the light strength, an integration control circuit 103, which is control means for controlling an integration operation of the line sensors 102a and 102b, an A/D converting circuit 104, which is reading means for A/D converting and reading out, as object data, the analog electric signals resulted from the photoelectric converting of two object images, and a CPU 105, which is computing means for outputting various control signals and for performing various kinds of computing such as correlation computing and interpolation computing. Two object images formed by the pair of photoreceptive lenses 101a and 101b, respectively, are detected by the pair of line sensors 102a and 102b, which are distance measuring sensors. Then, the two images are A/D converted and are output to the CPU 105 as object data. The CPU 105 performs distance measuring computing based on the object image data and performs AF control.

Figure 7A:
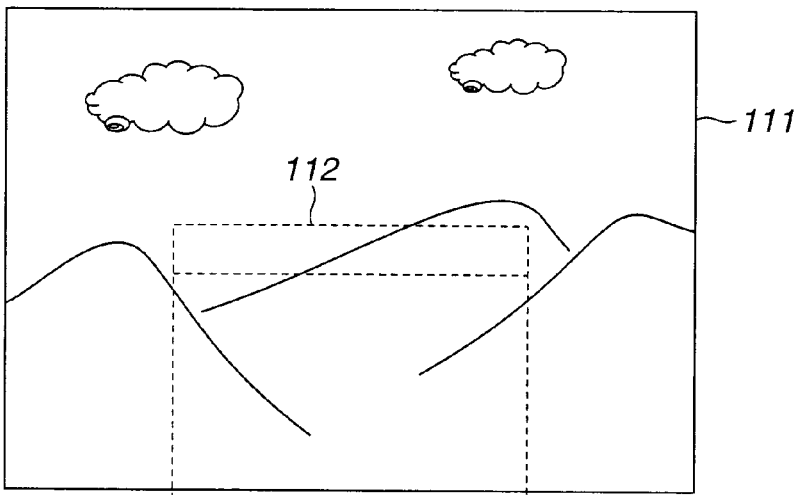
FIGS. 7A and 7B are diagrams for explaining an example of a subject with a monotonous increase and a monotonous decrease and an example of block divisions in a distance measuring area for detecting the monotonous increase and the monotonous decrease.
Figure 7B:
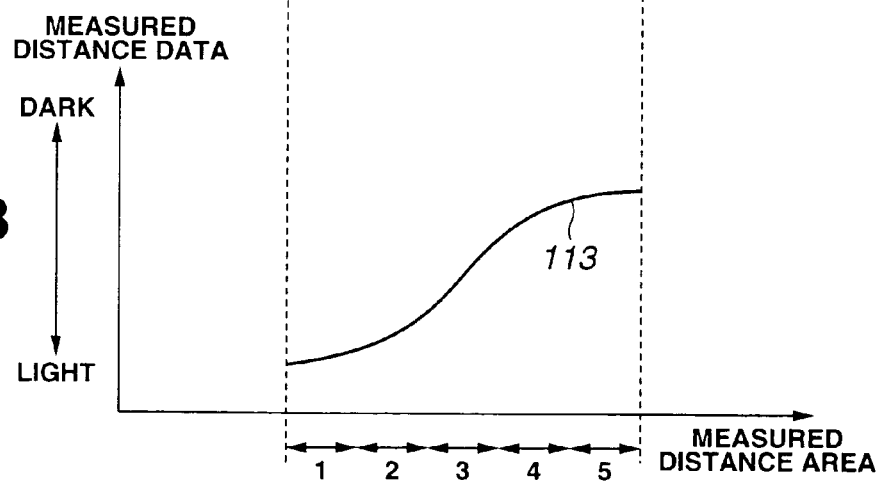
Figure 19:
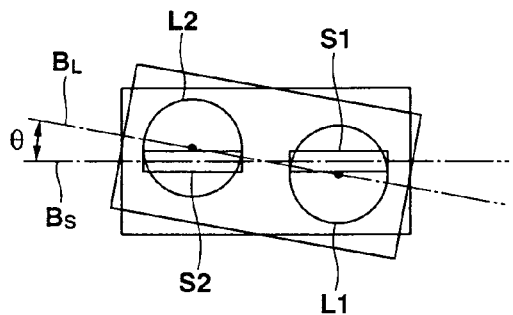
FIG. 19 is a front view of a distance measuring apparatus in which a line connecting light axis of a pair of photoreceptive lenses and a line connecting centers of a pair of line sensors are assembled at an angle.
Figure 20A:
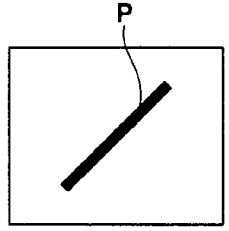
FIG. 20A is a diagram showing an ascending-toward-right diagonal pattern subject.
Figure 20D:
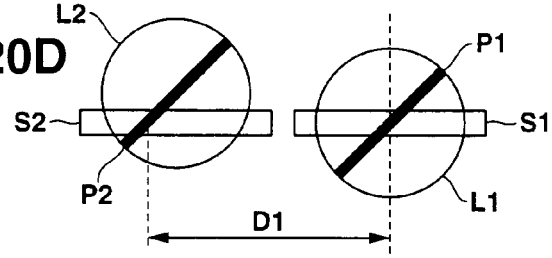
FIG. 20D is a diagram showing an image-forming position on line sensors S1 and S2 of the ascending-toward-right diagonal pattern subject.
Figure 20B:
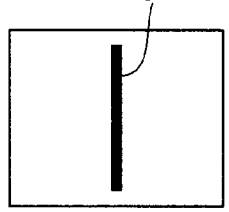
FIG. 20B is a diagram showing a vertical pattern subject.
Figure 20E:
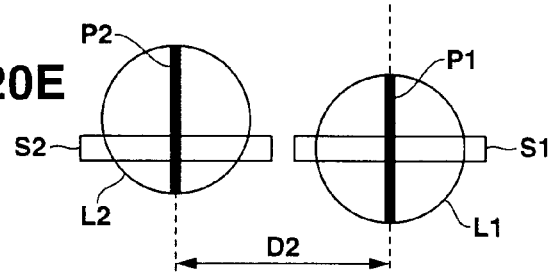
FIG. 20E is a diagram showing an image-forming position on the line sensors S1 and S2 of the vertical pattern subject.
Figure 20C:
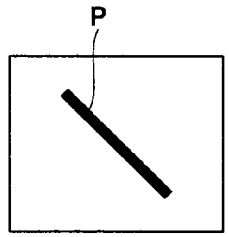
FIG. 20C is a diagram showing a ascending-toward-left diagonal pattern subject.
Figure 20F:
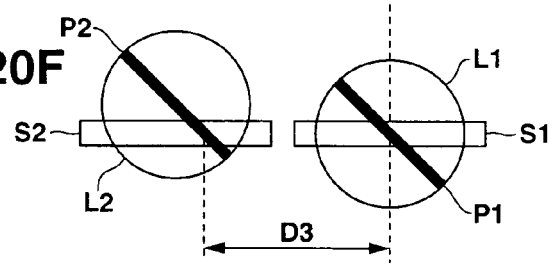
FIG. 20F is a diagram showing an image-forming position on the line sensors S1 and S2 of the ascending-toward-left diagonal pattern subject.
Figure 21:
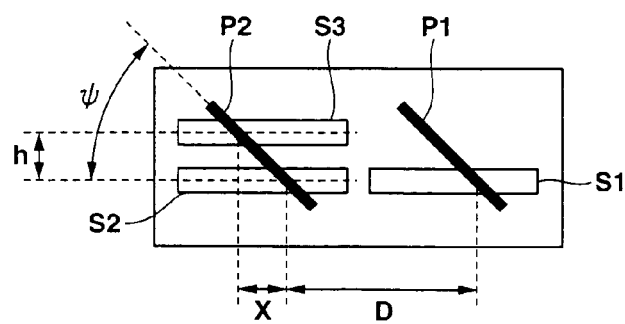
FIG. 21 is a diagram for explaining a sensor for passive distance measurement, which includes a third line sensor in a direction perpendicular to one line sensor of the pair of line sensors according to a related art.

In the distance measuring apparatus shown in FIG. 6, in order to shoot a landscape as shown in FIG. 7A, a distance measurement field of view (distance measurement area) 112 within a shooting screen 111 directs to the ridgeline of the mountain. Therefore, object image data 113 as shown in FIG. 7B is measured. The object image data 113 is data output from one sensor of the line sensors 102a and 102b, and the same data is output also from the other sensor. When an object having such a diagonal pattern is attempted to shoot, a rotational displacement θ as shown in FIG. 19 may exist between the photoreceptive lenses 101a and 101b and the line sensors 102a and 102b. Due to the rotational displacement, an error in distance measurement may occur.

Accordingly, in the second embodiment, the object image data 113 within the distance measurement area as shown in FIG. 7B is divided into five blocks as indicated by shown reference numerals 1 to 5. Then, average values A(1) to A(5) of the data within the blocks are calculated. When the computing results of differences A(1)−A(2), A(2)−A(3), A(3)−A(4) and A(4)−A(5) of the average values between blocks adjacent to each other are all positive or negative, the object is determined as one having a monotonous increase or monotonous decrease causing an error in distance measurement due to the rotational displacements of the photoreceptive lenses 101a and 101b and the line sensors 102a and 102b. In this case, the infinity determination value is switched to a value for a shorter distance than the one when the object has a monotonous increase or a monotonous decrease. The average value of data within the block means an average value of data of multiple sensors included in the blocks.

The infinite determination value for the object having a monotonous increase or a monotonous decrease is generally set in a range of the maximum distance measurement errors caused by the rotational displacement of the photoreceptive lenses 101a and 101b and the line sensors 102a and 102b and the object condition with reference to the distance to the object at infinity. For example, the infinite determination value for a case where an object at infinity may be measured mistakenly as 8 m is set between the normal infinite determination value and 8 m.

Figure 8:
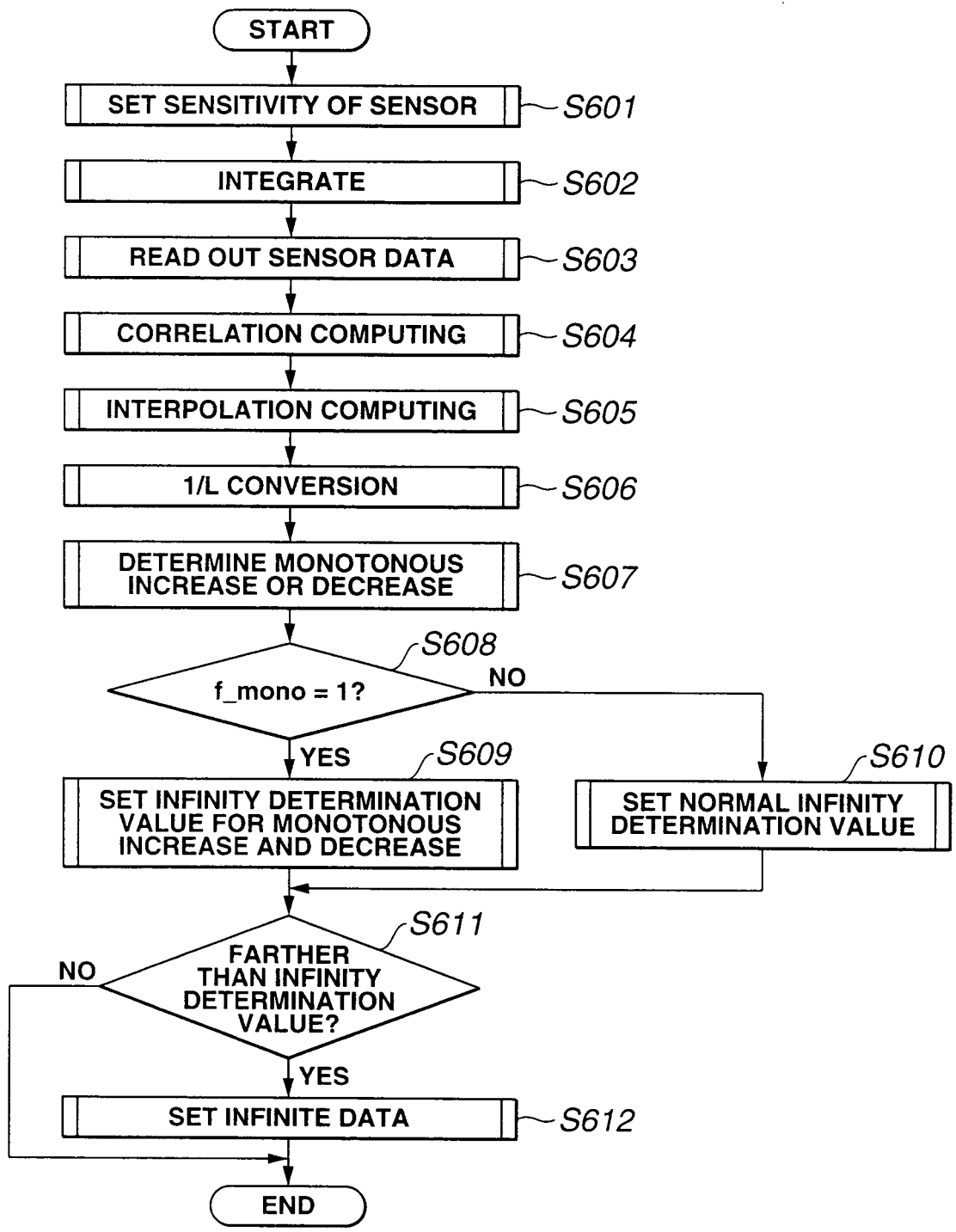
FIG. 8 is a flowchart showing an example of a distance measuring sequence according to the second embodiment.

FIG. 8 is a flowchart showing a distance measurement sequence according to the second embodiment.

First of all, the sensitivities of the line sensors 102a and 102b are set based on light measurement data, pre-integration data and so on (step S601). Next, the sensor sensitivities set at the step S601 are integrated. The integration is controlled by the integration control circuit 103 (step S602). Then, sensor data as a result of the integration at the step S602 is A/D converted and is read by the A/D converting circuit 104 (step S603).

Next, at a step S604, a correlation computing is performed for calculating a shift amount of data having the highest degree of agreement of the data of a pair of windows (ranges for extracting sensor data). Then, the processing goes to a step S605.

At the step S605, an interpolation computing is performed for calculating the fractional portion of the discrete shift amount having been calculated by the step S604.

Next, at a step S606, a shift amount S, which is a relative amount of displacement of the object having been calculated at the steps S604 and S605, is converted to the reciprocal data (1/L) of an object distance L by using Expression 1.

$$1/L = K \times S + \alpha \qquad \text{Expression 1}$$

where K and α are constants determined by the sensor pitch of the line sensor and the setting of the shift reference position of the correlation computing. Here, the shift amount S is converted to 1/L because the focusing position of the shooting lens is substantially proportional to 1/L and the output of a triangular distance measurement is also proportional to 1/L in principle. Thus, the computing can be simplified with 1/L.

At a step S607, whether the object has a monotonous increase or a monotonous decrease or not is determined.

Next, at a step S608, whether a monotonous increase or decrease flag (f_mono) is set or not is determined. If it is set, the processing goes to a step S609. If not, the processing goes to a step S610.

At the step S609, an infinity determination value is set for an object having a monotonous increase or a monotonous decrease.

At a step S610, an infinite determination value for a normal object is set.

Next, an infinite determination is performed. If the 1/L data having being calculated by the step S606 is farther than the infinite determination value, the processing goes to a step S612. If the 1/L data having being calculated by step S606 is nearer than the infinite determination value, the distance measurement sequence ends (step S611).

If the 1/L data is farther than the infinite determination value at the step S611, infinite data is set as object data (step S612).

Figure 9:
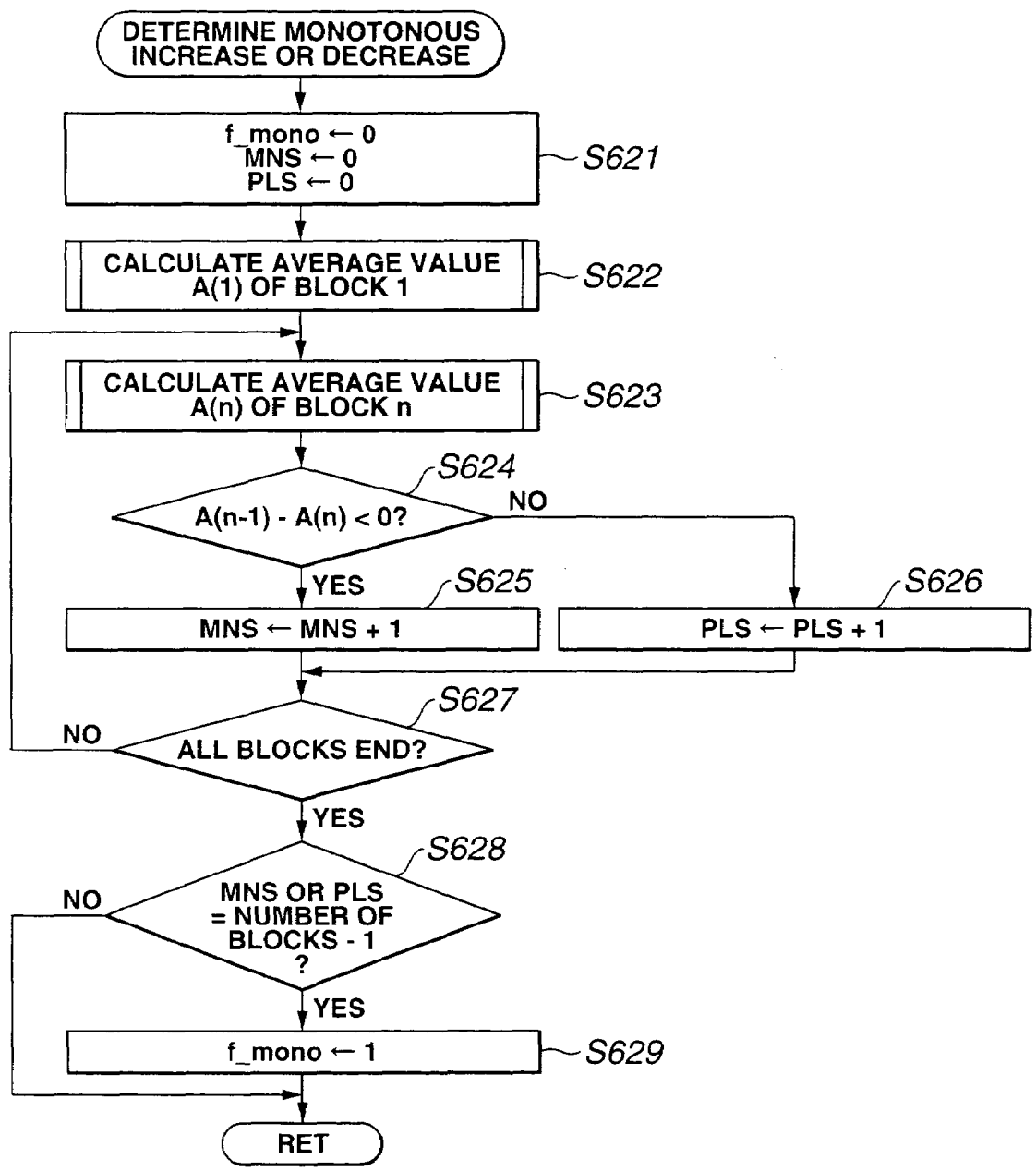
FIG. 9 is a flowchart showing steps of determining an object with a monotonous increase and a monotonous decrease.

FIG. 9 is a flowchart showing steps of determining an object with a monotonous increase or a monotonous decrease at the step S607 in FIG. 8.

First of all, the monotonous increase or decrease flag (f_mono ), a minus-sign counter (MNS), a plus-sign counter (PLS) are cleared, and n is set to 1 (step S621).

Next, an average value A(1) of object image data of the block 1 for monotonous increase or monotonous decrease determination is calculated (step S622).

Similarly, n is incremented, that is, when n=n+1, the average value A(n) of object image data within the block n for monotonous increase or monotonous decrease determination is calculated (step S623), and the processing goes to a step S624.

At the step S624, whether a difference between the average value A(n−1) of a block n−1 and the average value A(n) of the block n is negative data or not is determined. If the difference is negative data, the processing goes to a step S625. If the difference is positive data, the processing goes to a step S626.

At the step S625, the minus-sign counter (MNS) is incremented.

At the step S626, the plus-sign counter (PLS) is incremented.

Next, at the step S627, whether the calculation of the average values of the entire blocks and the determination of the signs of the difference with respect to the adjacent block have been completed or not is determined. If so, the processing goes to a step S628. If not, the processing goes to the step S623.

At the step S628, if the value of the minus sign counter (MNS) or the plus-sign counter (PLS) is the same as the number subtracted by 1 from the number of the blocks of the object with a monotonous increase or a monotonous decrease, the processing goes to a step S629. If not, the determination of the object with a monotonous increase or a monotonous decrease ends.

At the step S629, the monotonous increase or decrease flag (f_mono ) is set.

Next, the correlation computing at the step S604 in the distance measurement sequence in FIG. 8 will be described.

Figure 10A:
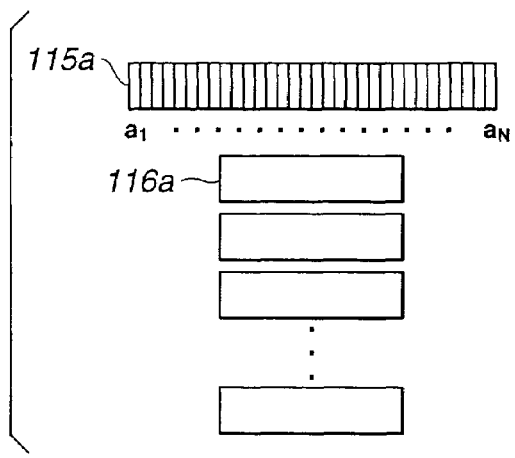
FIGS. 10A and 10B are diagrams for explaining a window shift method of correlation computing.
Figure 10B:
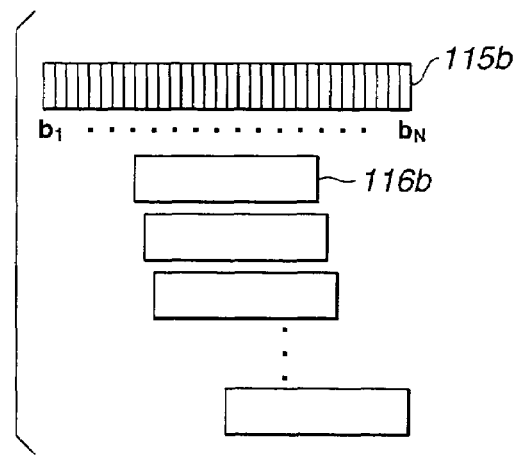

As shown in FIGS. 10A and 10B, the line sensors 115a and 115b (corresponding to the line sensors 102a and 102b in FIG. 6) include multiple photoelectric converting elements and outputs sensor data a1, a2, . . . and aN and b1, b2, . . . and bN, respectively. Based on the sensor data, data in predetermined extraction ranges (called windows) 116a and 116b are extracted. The simplest extracting method is to fix one window 116a and shift the other window 116b by one sensor. The fixed side and the shifted side may be reversed. A correlation amount F(n) is calculated by Expression 2 by using the extracted data of the pair of windows.

$$F(n) = \sum_{i=0}^{w-i} |ak + i - bk + i + n| \qquad \text{Expression 2}$$

(where n: shift amount, w=a number of data within window, i: data No, within window, and k: first sensor data No, of computing area).

Figure 11:
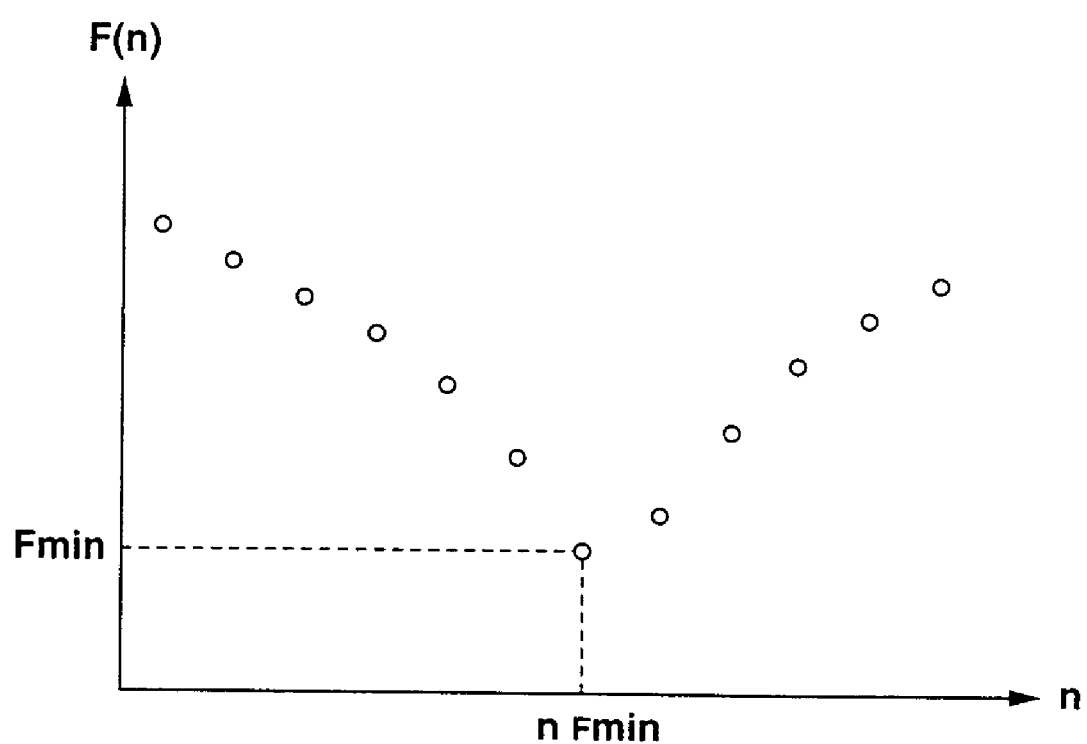
FIG. 11 is a diagram showing an example of a correlation data graph showing correlation values for respective shift values.

The highest degree of agreement is obtained between data of the pair of windows 116a and 116b when the correlation amount F(n) calculated by shifting the window 116b by one sensor is a minimum value [F(n)=Fmin] as shown in FIG. 11. The shift amount n=nFmin is a relative displaced amount of the object image.

Figure 12A:
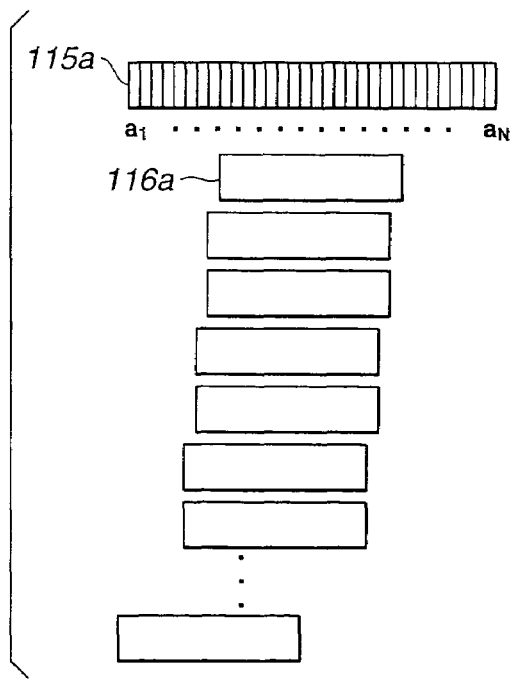
FIGS. 12A and 12B are diagrams for explaining another example of the window shift method of correlation computing.
Figure 12B:
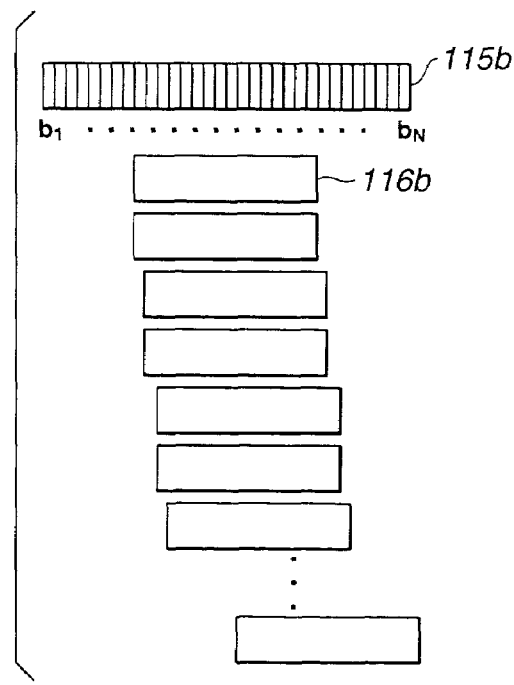

The window extracting method may be a method in which the windows 116a and 116b are shifted alternately as shown in FIGS. 12A and 12B. The correlation amount F (na, nb) in this case is calculated by Expression 3.

$$F(na, nb) = \sum_{i=0}^{w-i} |ak + i - na - bk + i + nb| \qquad \text{Expression 3}$$

(where na: a shift amount of the window 116a and nb: a shift amount of the window 116b).

The relative displaced amount nFmin is the sum of na and nb (na+nb) when f(na, nb) is the minimum.

Next, the interpolation computing at the step S605 in the distance measurement sequence in FIG. 8 will be described.

The relative displaced amount of an object formed on the line sensors 115a and 115b, which can be calculated by the correlation computing, is a discrete value in accordance with the sensor pitch of the line sensor, as shown in FIG. 11, and the pitch width is the smallest resolution of the distance measurement. Therefore, when the distance measurement is performed by using only the image displaced amount calculated by the correlation computing, the precision of the distance measurement is low. Accordingly, in order to increase the precision of the distance measurement, the interpolation computing as described below is performed by using the discrete correlation amount F(n).

Figure 13A:
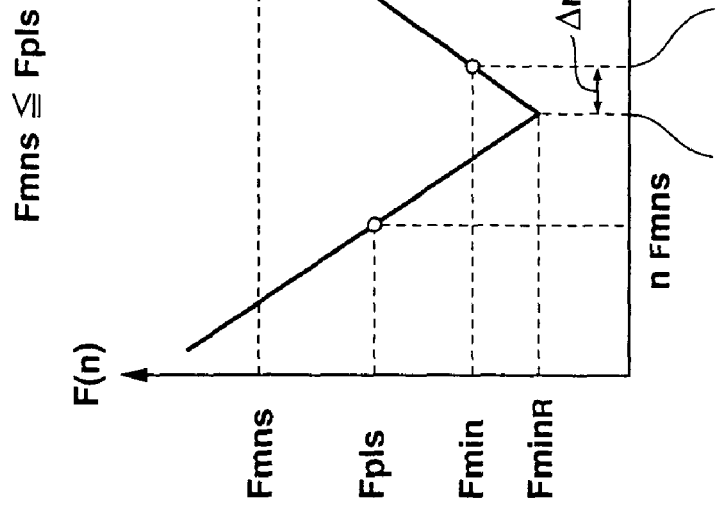
FIGS. 13A and 13B are diagrams for explaining an example of interpolating computing.
Figure 13B:
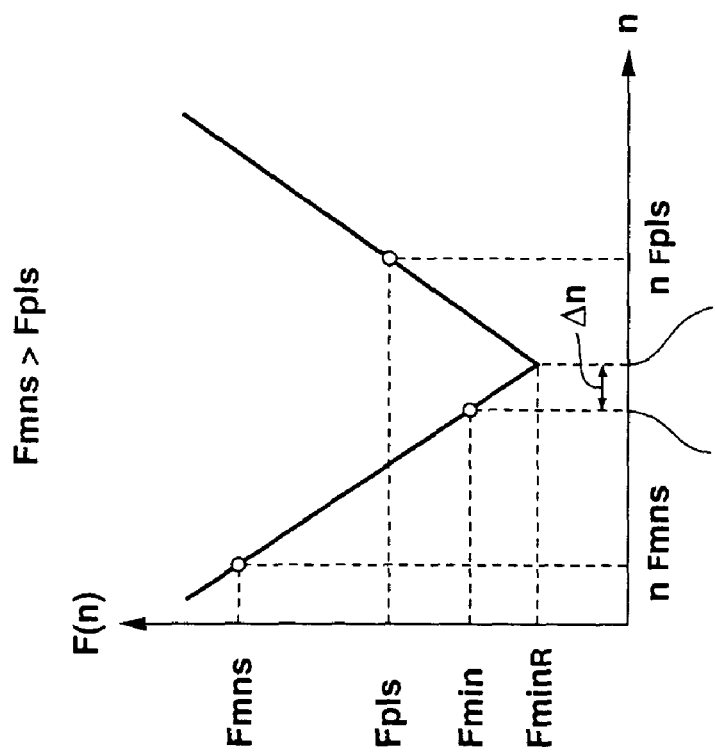

Generally, as shown in FIGS. 13A and 13B, the interpolation computing calculates a displaced amount Δn between a shift amount nFmin giving Fmin and a shift amount nFminR giving a real minimum value FminR by using correlation amounts Fmns and Fpls between the minimum value Fmin of the correlation amount F(n) and the prior and subsequent shift amounts nFmin−1 and nFmin+1, in accordance with the magnitude relationship between the Fmin and Fpls. The interpolation computing can be performed by using Expression 4 or Expression 5.

In FIGS. 13A and 13B, Fmin is the minimum correlation value, Fmns is the correlation value when the shift amount is Fmns(nFmin−1), Fpls is the correlation value when the shift amount is nFpls(nFmin+1), FminR is the correlation value at the shift amount nFminR calculated by interpolation computing, nFmin is the shift value when the correlation value is the minimum, nFmns is the shift amount of nFmin−1, nFpls is the shift amount of nFmin+1, and nFminR is the shift amount calculated by interpolation computing. where Fmns>Fpls (FIG. 13A)

$$\Delta n = \frac{Fmns - Fpls}{(Fmns - Fmin) \times 2} \qquad \text{Expression 4}$$

where Fmns≦Fpls (FIG. 13B)

$$\Delta n = \frac{Fpls - Fmns}{(Fpls - Fmin) \times 2} \qquad \text{Expression 5}$$

From the calculated interpolation amount Δn, the real displacement amount nFminR is where Fmns>Fpls (FIG. 13A)

nFminR=nFmin+Δn  Expression 6 and, where Fmns≦Fpls (FIG. 13B)

nFminR=nFmin−Δn  Expression 7

Figure 14A:
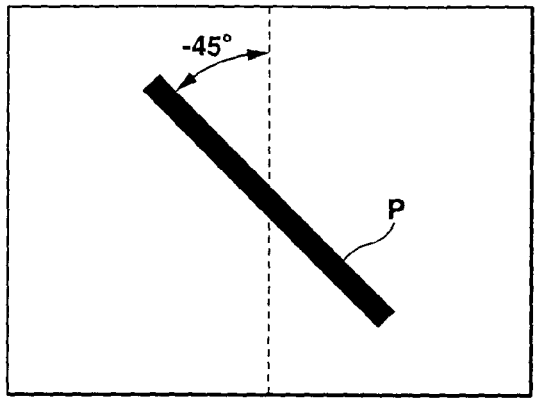
FIGS. 14A and 14B are diagrams showing an example of a chart for calculating an adjustment value A in accordance with the distance measurement error range caused by a rotational displacement of photoreceptive lenses and line sensors of a distance measuring apparatus.
Figure 14B:
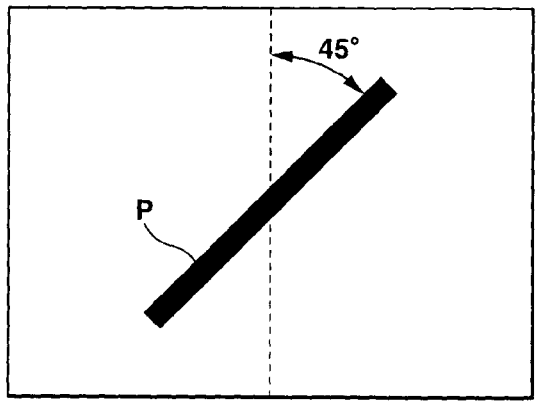
Figure 15:
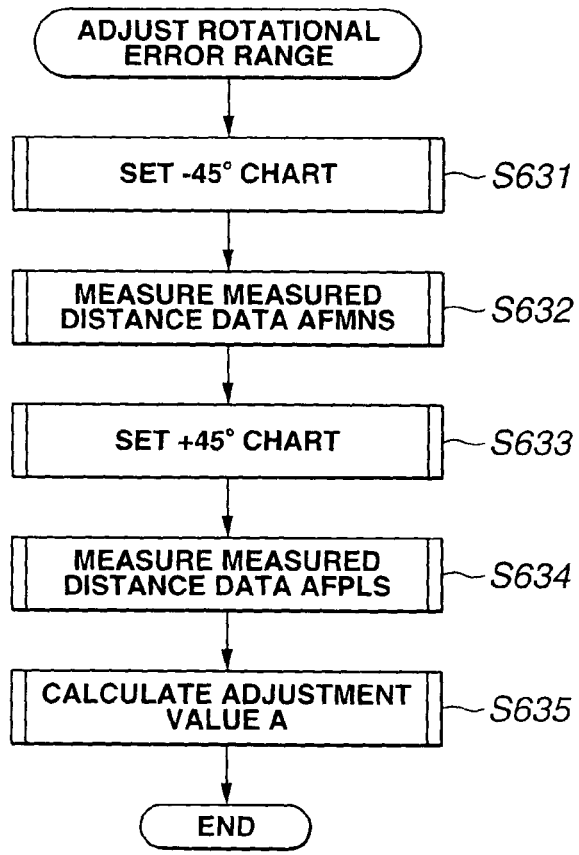
FIG. 15 is a flowchart showing means for calculating an adjustment value A in accordance with the distance measurement error range caused by a rotational displacement of photoreceptive lenses and line sensors of a distance measuring apparatus.

The infinite determination value may be determined by performing adjustment for calculating a measured distance data difference or a value as a result of the multiplication of the data difference by a predetermined coefficient when distances are measured on a charts having −45° and +45° pattern as shown in FIGS. 14A and 14B by following steps in a flowchart in FIG. 15.

FIG. 15 is a flowchart indicating a method for calculating an adjustment value A in accordance with the distance measurement error range due to the rotational displacement of photoreceptive lenses and the line sensors of the distance measuring apparatus.

First of all, the −45° chart shown in FIG. 14A is set at a predetermined position (step S631). Then, the distance of the −45° chart in FIG. 14A is measured, and measured distance data AFMNS is calculated (step S632).

Next, the +45° chart shown in FIG. 14B is set at a predetermined position (step S633). Then, the distance of the +45° chart in FIG. 14B is measured, and measured distance data AFPLS is calculated (step S634).

Next, the adjustment value A is calculated by Expression 8. When a predetermined coefficient K is multiplied, the adjustment value A is calculated by Expression 9 (step S635).

A=|AFMNS−AFPLS|  Expression 8

A=|AFMNS−AFPLS|×K  Expression 9

According to the second embodiment, whether or not an object has a monotonous increase or a monotonous decrease is detected. Then, by switching the infinite determination value, the accurate infinite determination can be performed.

Third Embodiment

The construction of a distance apparatus according to a third embodiment is the same as the construction of the distance measuring apparatus shown in FIG. 6.

According to the third embodiment, in an distance measuring apparatus having the construction in FIG. 6, a distance measurement field of view (distance measurement area) is divided into multiple areas, and distances of multiple areas are measured in a shooting screen. That is, for performing multi-AF, a distance measurement area is selected from which the nearest measured distance data in the multiple distance measurement areas is calculated. Then, a monotonous increase or monotonous decrease object determination like the second embodiment is performed in the distance measurement area. When an object in the distance measurement area has a monotonous increase or a monotonous decrease, the infinite determination value is switched to a nearer value than the value when the object does not have a monotonous increase or a monotonous decrease.

Figure 16A:
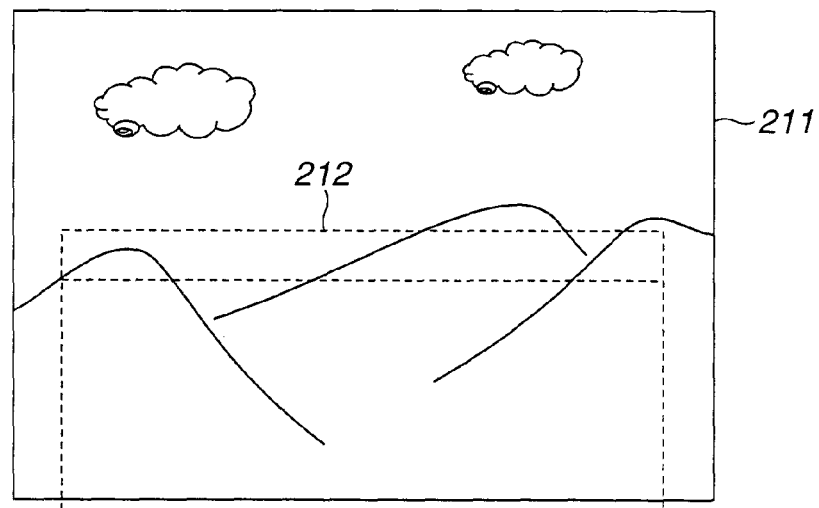
FIGS. 16A and 16B relate to a third embodiment of the invention and are diagrams for explaining an example of a subject including subjects with a monotonous increase and a monotonous decrease and an example of divisions of a distance measuring area during the multi-AF.
Figure 16B:
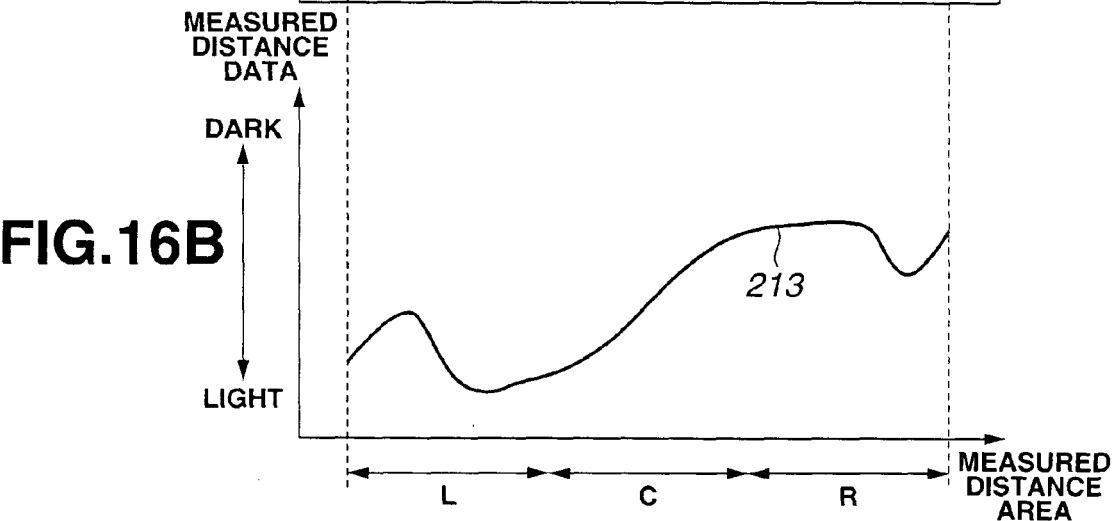

For example, in order to shoot a landscape as shown in FIG. 16A, a distance measurement field of view (distance measurement area) 212 within a shooting screen 211 is divided into multiple areas L, C and R. In order to measure distances of the multiple areas within the shooting screen 211, object image data 213 as shown in FIG. 16B is measured. Then, the object image data 213 is divided into distance measurement areas L, C and R, and the measured distance data is calculated by using the respective data of the distance measurement areas. Here, when the measured distance data in the distance measurement area L or R is the nearest data in the multiple areas, the pattern of the object image data in the distance measurement area L or R is not a monotonous increase or a monotonous decrease. Therefore, the normal infinite determination is performed. On the other hand, when the measured distance data in the distance measurement area C is the nearest data in the multiple areas, the pattern of the object data in the distance measurement area is a monotonous increase or a monotonous decrease. Therefore, the infinity determination value is switched to a determination value corresponding to a nearer distance than the normal one for performing the infinite determination.

FIG. 17 is a flowchart showing a distance measurement sequence according to the third embodiment.

First of all, the sensor sensitivities of the line sensors 102a and 102b are set based on the measured light data, pre-integration data and so on (step S701). Next, the integration is performed by using the sensor sensitivities having been set by the step S701. The integration is controlled by the integration control circuit 103 (step S702). Then, at a step S703, the sensor data resulting from the integration by the step S702 is A/D converted and is read by the A/D converting circuit 104.

Next, a distance measurement area is set for correlation computing at a next step S705 (step S704). Then, at the step S705, the correlation computing is performed for calculating a shift amount of data having the highest degree of agreement between data of the pair of windows. At a step S706, an interpolation computing is performed for calculating a fractional part of the discrete shift amount having been calculated by the step S705.

Next, at a step S707, whether the computing on the entire distance measurement areas ends or not is determined. If the computing on the entire distance measurement areas ends, the processing goes to a step S708. If not, the processing returns to the step S704.

At the step S708, the distance measurement area from which the nearest measured distance data is calculated is selected.

Then, a shift amount S is converted to the reciprocal data (1/L) of the object distance L. Here, the shift amount S is a relative displaced amount of the object, which has been calculated by the steps S705 and S706 for the distance measurement area selected by the step S708 (step S709).

Next, at a step S710, whether the object has a monotonous increase or a monotonous decrease or not is determined, and the processing goes to a step S711.

At the step S711, whether the monotonous increase or decrease flag (f_mono) is set or not is determined. If so, the processing goes to a step S712. If not, the processing goes to a step S713.

At the step S712, an infinite determination value is set for the object having a monotonous increase or a monotonous decrease.

At the step S713, an infinite determination value is set for the normal object.

Then, at a step S714, the infinity determination is performed. If the 1/L data having been calculated by the step S709 is farther than the infinite determination value, the processing goes to a step S715. If the 1/L data is nearer than the infinite determination value, the distance measurement sequence ends.

At the step S715, infinite data is set as the object data.

Figure 18:
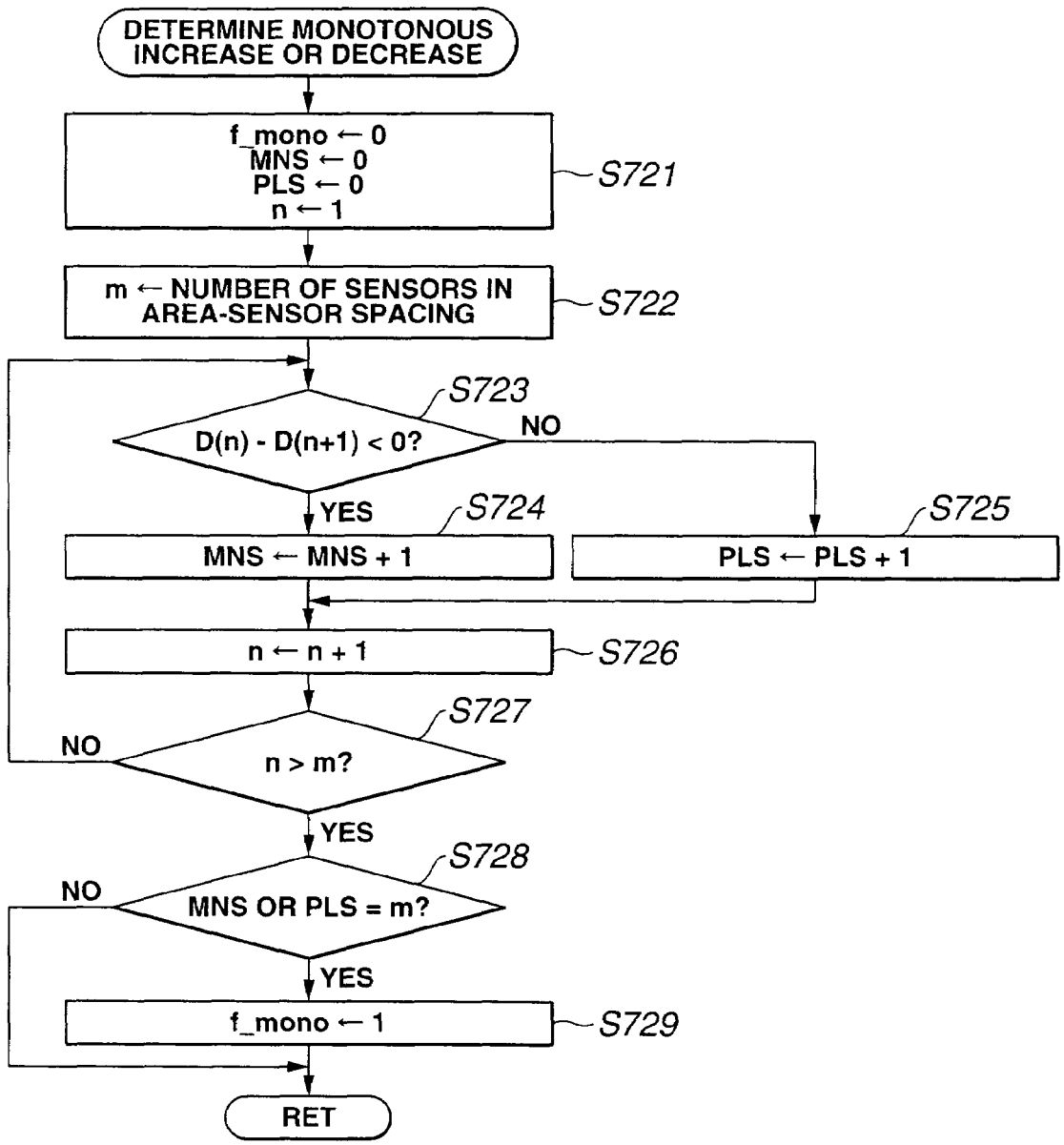
FIG. 18 is a flowchart showing steps of determining a subject with a monotonous increase and a monotonous decrease in FIG. 17.

FIG. 18 is a flowchart showing steps of the monotonous increase or monotonous decrease object determination at the step S710 according to the third embodiment in FIG. 17.

First of all, the monotonous increase/decrease flag (f_mono ), the minus sign counter (MNS), the plus sign counter (PLS), and a sign determination loop counter (n) are cleared (step S721).

Next, at a step S722, a sensor interval ($\alpha$) of the sensor pair for obtaining a data difference is subtracted from the number of sensors within the distance measurement area to be determined regarding the monotonous increase or the monotonous decrease, and the number (m) of the sign determination loops is calculated.

Then, at a step S723, whether the data difference (D(n)−D(n+1)) of the sensors apart from each other by the predetermined sensor interval ($\alpha$) is negative data or not is determined. If the data difference is negative data, the processing goes to a step S724. If the data difference is positive data, the processing goes to a step S725.

At the step S724, the minus sign counter (MNS) is incremented.

At the step S725, the plus sign counter (PLS) is incremented.

Then, at a step S726, the sign determination loop counter (n) is incremented.

Next, whether the sign determination loop counter (n) exceeds the number (m) of the sign determination loops or not is determined (step S727). If so, the processing goes to a step S728. If not, the processing returns to the step S723.

At the step S728, whether the value of the minus sign counter (MNS) or the plus sign counter (PLS) agrees with the number (m) of the sign determination loops or not is determined. If so, the processing goes to a step S729. If not, the monotonous increase or monotonous decrease object determination ends.

At a step S729, the monotonous increase or decrease flag (f_mono ) is set.

As described above, according to the third embodiment, the accurate infinite determination can be performed even when distances of multiple areas within a shooting screen are measured, that is, even for multi AF.

Fourth Embodiment

The construction of a distance measuring apparatus according to a fourth embodiment is the same as the construction of the distance measuring apparatus shown in FIG. 6.

In the second embodiment, a distance measurement area is divided into multiple blocks. Then, in response to a change in sign resulting from the calculation of a difference between average values of adjacent blocks, whether an object has a monotonous increase or a monotonous decrease or not is determined on the contrary, in the fourth embodiment, in response to a change in sign resulting from the calculation of a difference of data of sensors apart from each other by an amount corresponding to a number of predetermined sensors within the distance measurement area, whether an object has a monotonous increase or a monotonous decrease or not is determined.

In other words, the sensors apart from each other by an amount corresponding to a predetermined number of sensors are shifted by an amount corresponding to one sensor and the difference of data is calculated in that case, if the all of the signs are positive or negative, the object is determined as having a monotonous increase or a monotonous decrease.

As described above, according to the fourth embodiment, the accurate infinite determination can be performed like the second embodiment.

According to the second to fourth embodiment, in order to measure a distance to an object having a diagonal pattern such as a ridgeline of a mountain, the distance measurement optical system including line sensors and photoreceptive lenses may have a rotational error $\theta$. Then, the measured distance data is shifted to the closer side due to the rotational error $\theta$, and the camera therefore cannot determine the infinity by referencing to a reference value (infinite determination value) for the infinity determination. As a result, the photograph has a focus on the closer side (that is, the photograph is out of focus). The second to fourth embodiment can prevent the problem. Since the ridgeline of the mountain, for example, may have an image pattern in which data increases or decreases monotonously, whether or not the image pattern has a monotonous increase or decrease or not is determined before the infinity determination. If the image pattern has a monotonous increase or decrease, the infinity determination value is shifted to the closer side to perform the infinity determination. Even when the measured distance data is shifted to the closer side, the out-of-focus photograph of a landscape can be prevented.

As described above, according to the second to fourth embodiments, a distance measuring apparatus which can perform the accurate infinity determination can be obtained without expensive and special sensors even when an assembly error occurs in the distance measurement optical system including line sensors and photoreceptive lenses.

Fifth Embodiment

Figure 22:
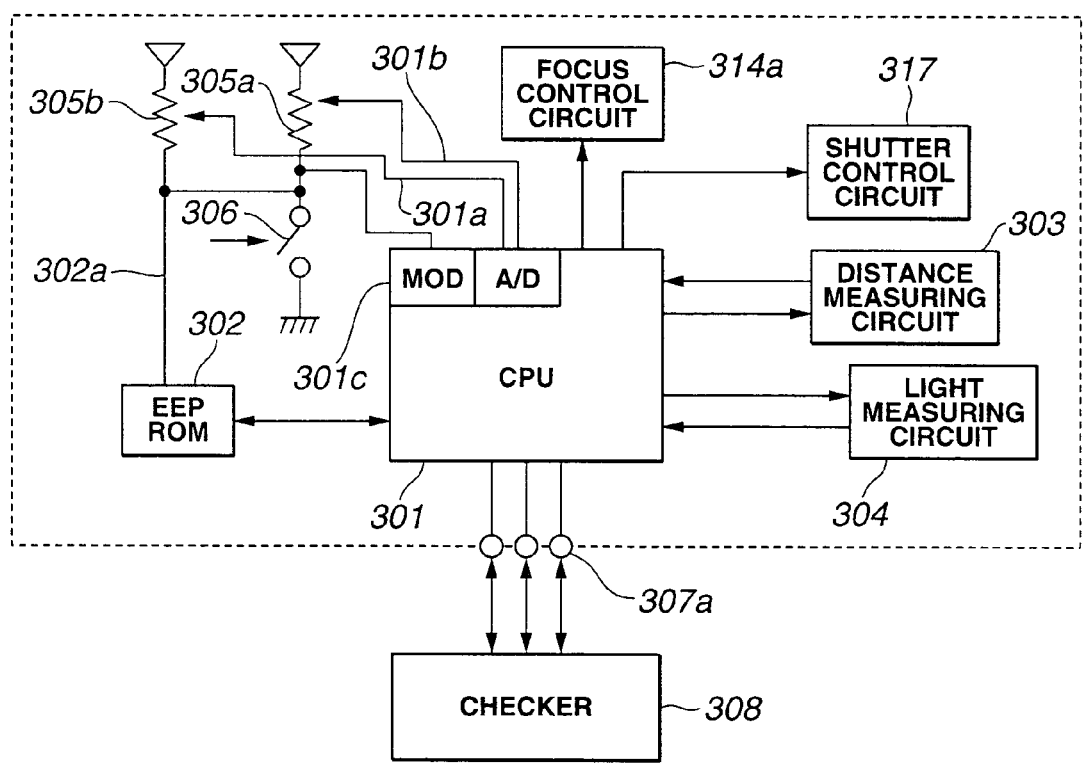

A fifth embodiment of the invention will be described with reference to FIGS. 22 to 33. FIG. 22 is a block diagram showing the electric construction of a printed circuit board for an electronic circuit of a camera according to the fifth embodiment. In other words, this camera has a printed circuit board (called "board" hereinafter) 310 for an electronic circuit for focusing and/or controlling the exposure of the camera. Implemented on the board 310 are a CPU 301, a memory (EEPROM) 302, a distance measuring circuit 303, a light measuring circuit 304, semifixed resisters (volumes) 305a and 305b, a focus control circuit 314a and a shutter control circuit 317.

The CPU 301 includes a one-chip microcomputer and is a calculation control unit having a function as a sequence controller for operation control of the entire camera and for adjustment operations of the camera. Here, the CPU 301 corresponds to the control means.

The EEPROM 302 is an electrically writable memory storing various kinds of data such as correction data for correcting an error during the production of the camera. In this embodiment, an EEPROM is used as the memory. However, the memory is not limited to an EEPROM, but any non-volatile semiconductor memory may be used as the memory.

The correction data written in the EEPROM 302 is unique data different for each camera. The correction data is written during the production of the camera mainly for correcting an error caused in accordance with the performance of parts during the camera production and data (error) displaced from a design value because of the error caused during the assembly of the camera.

For example, in order to calculate the correction data in an adjustment step in a camera mass production factory, a dedicated adjuster (checker) 308 is connected through a connecting terminal 307a of the board 310 and is caused to communicate with the CPU 301 in the camera. Then, a distance measurement and a light measurement are performed under a reference condition based on the subroutine program stored in a ROM, not shown, in the CPU 301. Displaced amounts (error) between the results of the distance measurement and the light measurement and the design values are calculated, and the values canceling the displaced amounts may be calculated as the correction data.

As the correction data to be written in the EEPROM 302, the design values may be written therein instead of errors from the design values because of the errors in parts.

The distance measurement circuit 303 is a circuit for measuring an object distance for adjusting the focus of the camera. Based on the object distance measured by the distance measurement circuit 303, the CPU 301 controls the focus control circuit 314a for adjusting the focus of the camera.

The light measurement circuit 304 is a circuit for measuring an object brightness for performing exposure control during the shooting by the camera. Based on the object brightness measured by the light measurement circuit 304, the CPU 301 controls the shutter control circuit 317 so that the shutter control of the camera can be performed.

The two volumes 305a and 305b are provided between a power supply and an adjustment mode setting input terminal (MOD) 301c of the CPU 301. Sliders for the volumes 305a and 305b are connected to A/D converting terminals (A/D) 301a and 301b, respectively, of the CPU 301. In response to the adjustment operation of the volumes 305a and 305b, the sliders move. The partial potential voltage depending on the movement is given to the A/D 301a or 301b, is A/D converted, and is input to the CPU 301.

The input terminal MOD 301c of the CPU 301 is grounded through a switch 306. Then, the CPU 301 determines the ON manipulation of the switch 306 based on the state of the potential level of the MOD 301c and, in accordance with the determination, changes correction data written in the EEPROM 302 to a value corresponding the voltage adjustment result of the volumes 305a or 305b incorporated by the A/D 301a or 301b by following the program for the manual adjustment mode stored in a ROM, not shown. Here, the two volumes 305a and 305b are provided on the board 310, one for adjusting correction data roughly and the other for adjusting correction data in detail. For example, the volumes 305a is for adjusting correction data roughly and the volume 305b is for adjusting correction data in detail.

Here, the switch 306 is provided to switch the potential level of the MOD 301c. However, open terminals may be used instead of the switch 306. Then, the open terminals are shorted by soldering and are electrically opened by removing the solder.

A protective terminal 302a is provided in the EEPROM 302 for protecting correction data written in the EEPROM 302. The protective terminal 302a is electrically connected to an input terminal MOD 301c of the CPU 301 such that the input terminal MOD 301c and the protective terminal 302a can have the same potential. In other words, the potential level of the protective terminal 302a changes in accordance with that of the MOD 301c. Only when the potential level of the MOD 301c is L and the camera enters into the manual adjustment mode, correction data can be written in the EEPROM 302. When a circuit and/or an element on the board 310 have a failure such as a damage, the protective terminal 302a of the EEPROM 302 is protected. Thus, correction data cannot be written in the EEPROM 302.

Figure 23A:
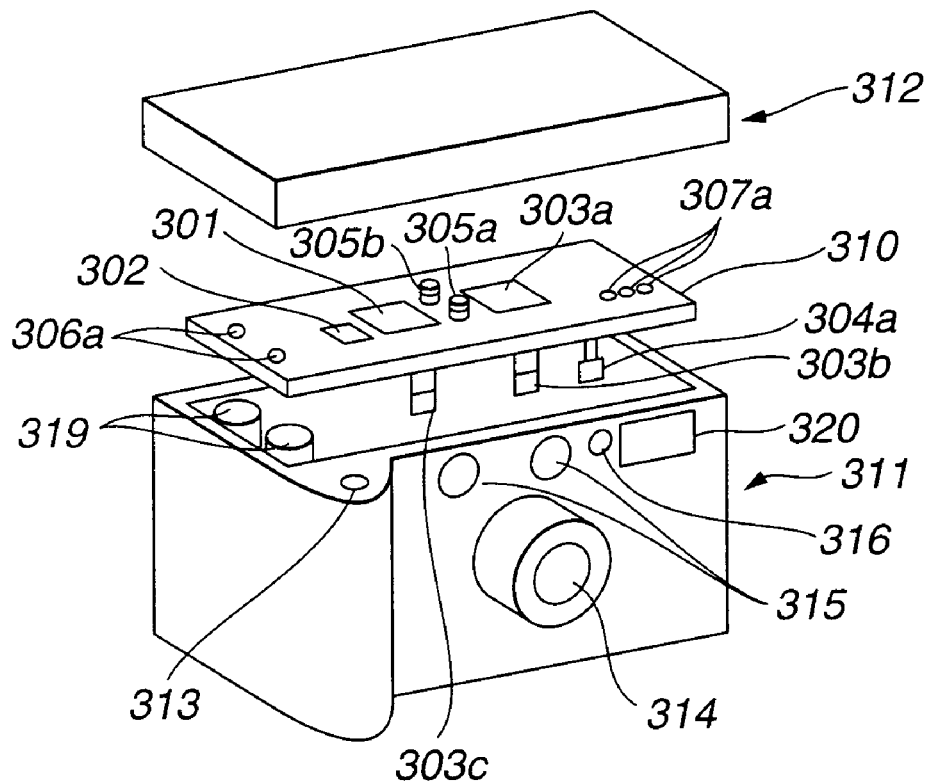
FIG. 23A is a diagram showing an external appearance construction and internal construction of the camera according to the embodiment having the printed circuit board for an electronic circuit.

FIG. 23A is a diagram showing an external appearance construction and internal construction of the camera according to this embodiment having the printed circuit board for an electronic circuit.

In other words, when an upper cover 312 is removed from an exterior 311 of the camera, the board 310 is built in the external 311 such that the board 311 can be exposed. The circuits and elements implemented on the board 310 are power-supplied by a battery 319. A release button 313 is provided on the external 311. In the final product, when the ON state of a release switch, not shown is determined based on the manipulation state of the release button 313, a sequence control over shooting operations such as distance measurement and light measurement can be performed in accordance with the program stored in a ROM, not shown, in the CPU 301.

A shooting lens 314, a distance measurement window 315, a light measurement window 316 and a strobe light emitting portion 320 are provided on the front surface of the exterior 311 of the camera. The strobe light is supplemental light during the exposure.

Implemented on the top surface of the board 310 are the CPU 301, the EEPROM 302, and an IC 303a including the distance measurement circuit 303, the light measurement circuit 304, the focus control circuit 314a and the shutter control circuit 317, the volumes 305a and 305b, a check land 306a for causing the camera to enter into the manual adjustment mode by being shorted by soldering, for example, in accordance with the state of the switch 306, and the connecting terminal 307a. Apparently, the circuits within the IC 303a may be provided independently.

Implemented on the bottom surface of the board 310 are a phototransmitter 303b and a photoreceptor 303c at positions where the projection and the receipt of the distance measurement light through the distance measurement window 315 on the external 311 are possible. An object distance can be measured by the distance measurement circuit 303 based on the results of the phototransmitter 303b and the photoreceptor 303c. Furthermore, a light measurement sensor 304a is provided at a position where the object brightness can be measured through the light measurement window 316 on the external 311 on the bottom surface of the board 310. The object brightness can be measured by the light measurement circuit 304 based on the result of the light measurement sensor 304a.

Figure 23B:
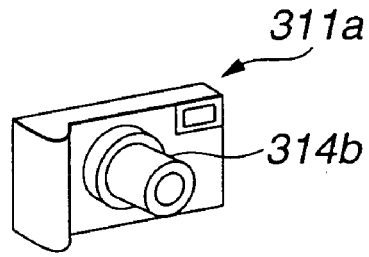
FIG. 23B is a perspective diagram showing an external appearance example of a camera having a zoom lens of a long-focus type.
Figure 23C:
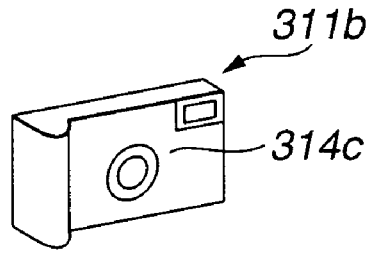
FIG. 23C is a perspective diagram showing an external appearance example of a camera having a unifocal lens.
Figure 24A:
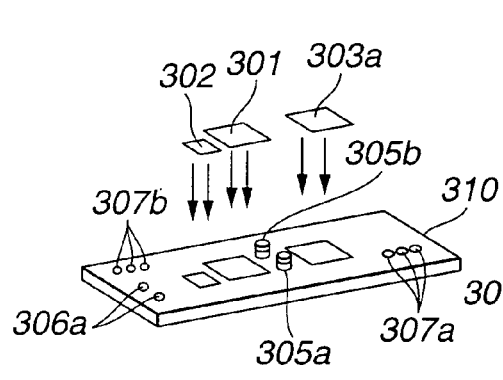
FIG. 24A is a diagram for explaining the implementation of parts on a board when a camera is manufactured or is repaired.
Figure 24B:
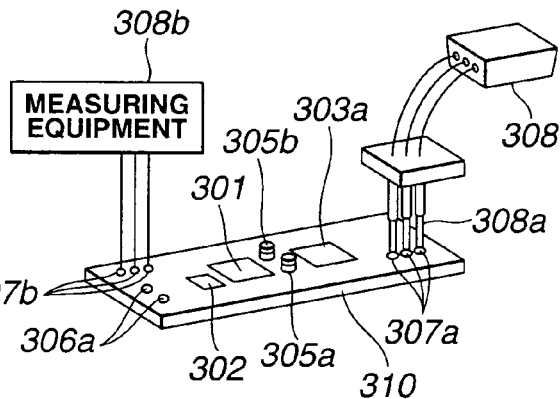
FIG. 24B is a diagram for explaining a state where whether or not the communication between a checker and a CPU can be performed when the camera is manufactured or is repaired.

The board 310 having the above-described construction may be used commonly to a camera 311a giving a long focal type zoom-lens (314b) as shown in FIG. 23B and a camera 311b having an unifocal lens (314c) as shown in FIG. 23C. Therefore, in a board implementation section of a camera factory, parts (such as the CPU 301, the EEPROM 302 and the IC 303a) are implemented on the board 310 as shown in FIG. 24A. Then, in a later process, a pin 308a of the checker 308 is connected to the connecting terminal 307a as shown in FIG. 24B, and whether the checker 308 and the CPU 301 can communicate with each other or not is checked. In this case, the CPU 301 checks whether the implementation of the other circuits and elements on the board 310 has been performed properly or not. Furthermore, it is checked whether a predetermined signal is output or not when a predetermined signal is input from the measuring equipment 308b connected through the connecting terminal 307b on the board 310.

Figure 25:
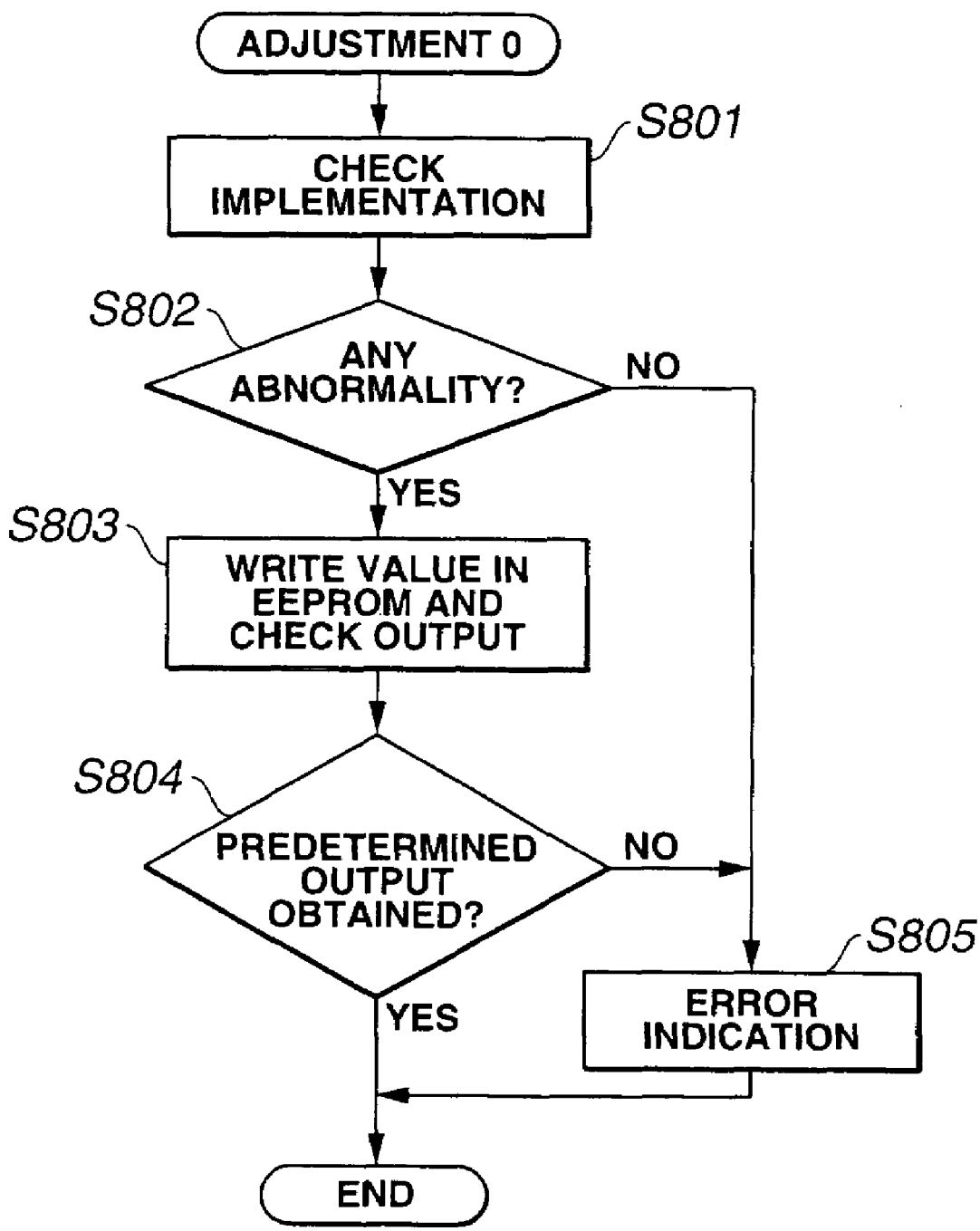

FIG. 25 is a flowchart for showing a series of checking steps.

In other words, after the checker 308 and the measuring equipment 308b are connected to the board 310, the operation in the flowchart is started. Then, first of all, whether the circuits and/or elements on the board 310 are implemented properly or not is checked (S801). As described above, first of all, the implementation of the CPU 301 is checked by causing the checker 308 to communicate with the CPU 301. Then, the CPU 301 checks the other circuits and/or elements and sends the results to the checker 308. Thus, the implementations of the other circuits and/or elements can be checked. Then, the checker 308 determines whether any circuit or element on the board 3 has any abnormality or not based on the result of the implementation check at the step S801 (S802).

As a result of the determination at the step S802, when it is determined that a circuit or an element on the board 310 have an abnormality, an error indication is performed by an indicator, not shown, of the checker 308 (S805), then, the operation in this flowchart ends. In accordance with the error indication, the circuit and/or element on the board 310 are implemented properly and are checked again.

On the other hand, as a result of the determination at the step S802, when circuits and/or elements in the board 310 do not have an abnormality, values corresponding to the design values of the circuits and/or elements on the board 310 are written in the EEPROM 302. Then, a predetermined signal, such as a signal corresponding to a distance measurement signal input to the distance measurement circuit 303, is input from the measuring equipment 308b, and the measuring equipment 308b checks the output (S803). Next, whether a predetermined output, that is, the design value has been obtained or not by the step S803 is determined (S804). As a result of the determination on whether or not the predetermined output has been obtained, if the predetermined output has not been obtained, the processing goes to a step S805. Then, an error indication is performed in an indicator, not shown, of the measuring equipment 308b, and the operation in the flowchart ends. When the error indication is performed, the circuits and/or elements on the board 310 are adjusted as described later. On the other hand, as a result of the determination by the step S804, the fact that the predetermined output has been obtained is determined, the operation of the flowchart ends directly.

When the board, which is a common part, can be mass-produced in the board implementation factory, the depreciation of the facility investment to the checker 308 can be achieved more easily.

However, different kinds of cameras, such as cameras 311a and 311b, are manufactured, one product may be popular or small batches of a variety of product may be produced. In that case, the investment to the introduction of the checker 308 may not be always recovered. The product costs may be reduced by promoting to reduce the production lead-time by the production in a consumer area. However, in this case, the arrangement of the checker 308 may not in time in some areas. Furthermore, in consideration of the costs of the introduction of the checker 308, the manual adjustment may be cheaper. Therefore, in that case, the adjustment may be performed manually.

Furthermore, different AF adjustment methods are used for a product requiring strict adjustment by using the checker 308, such as the camera 311a having a zoom lens with a large zoom rate in FIG. 24C, and a product only requiring simplified manual adjustment, such as the unifocal camera 311b with a deep depth of field in FIG. 24D.

Figure 26:
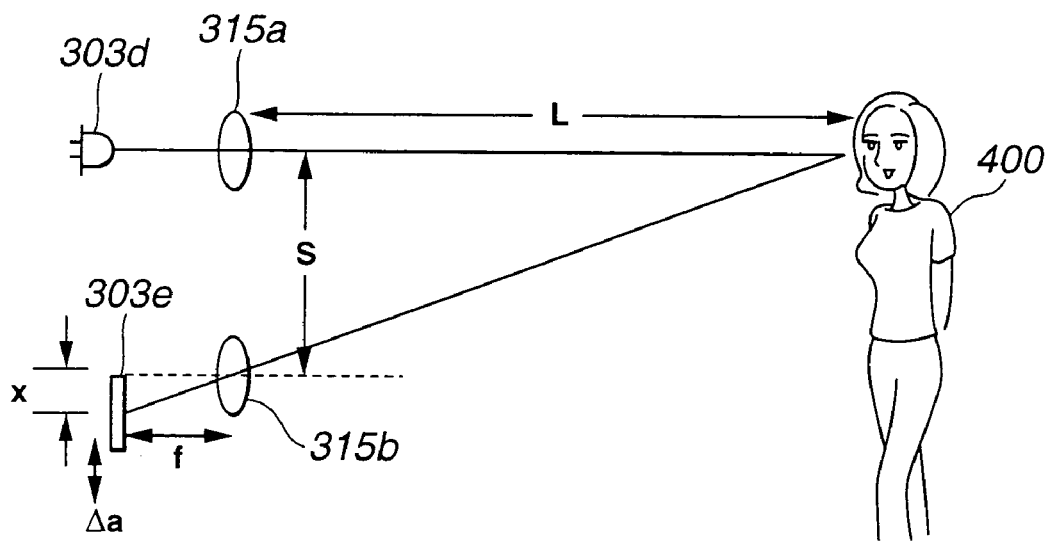

Here, before the description of the detail of the manual adjustment, a distance measurement circuit of an AF apparatus of a camera based on the triangular distance measurement principle will be particularly described with reference to FIG. 26 first of all.

An infrared light emitting diode (IRED) 303d corresponding to the phototransmitter 303b, which is a phototransmitting means for the AF, projects a distance measurement light onto an object 400 through a light projecting lens 315a for distance measurement. Here, the signal light reflected from the object 400 is guided to a light position detecting element (PSD) 303e corresponding to the photoreceptor 303c by the photoreceptive lens 315b, and the incident position x is detected. The PSD 303e is a semiconductor element for varying an output signal in accordance with the incident position of the light.

After the incident position x is detected by the PSD 303e, an object distance L is calculated based on the fact that the incident position x changes in accordance with the object distance L. In other words, when the distance between the light projecting lens 315a and the photoreceptive lens 315b is a base line length S and a focal distance of the photoreceptive lens 315b is f, the object distance L can be calculated by Expression 10 mentioned below by detecting the x. A let-out amount K of a shooting lens in accordance with the focus position can be calculated by using Expression 11 mentioned below from the calculated object distance L.

$$L = \frac{Sf}{x} \qquad \text{Expression 10}$$

$$K = K_0 \frac{1}{L} = K_0 \left( \frac{1}{Sf} x \right) \qquad \text{Expression 11}$$

where $K_0$ is a constant.

In the AF apparatus as described above, the proper positioning of the lenses and elements is important. When the PSD 303e is displaced from the proper position by an amount of a positional error $\Delta a$, an object distance $L_E$ including an error A as expressed by Expression 12 below is calculated. As a result, the let-out amount of the shooting lens as expressed by Expression 13 below may have an error $K_E$.

$$\frac{1}{L_E} = \frac{1}{Sf}(x + \Delta a) = \frac{1}{Sf} x + \frac{\Delta a}{Sf} = \frac{1}{Sf} x + A \qquad \text{Expression 12}$$

$$K_E = K_0 A = K_0 \frac{\Delta a}{Sf} \qquad \text{Expression 13}$$

Figure 27A:
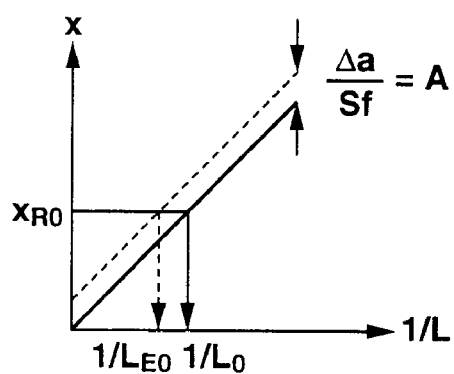
FIG. 27A is a diagram showing a relationship between an incident position of reflection signal light from a subject and a subject distance.

FIG. 27A shows a relationship between the object distance L and the incident position x, where the object distance L is shown as the reciprocal 1/L. When the positional error $\Delta a$ exists, the relationship between the reciprocal 1/L of the object distance and the incident position x may have the error A as expressed by Expression 12. Therefore, when the incident position is $X_{R0}$, the calculated object distance is not actual $1/L_0$ but $1/L_{E0}$ including the error. Therefore, during the production of many cameras, the error A is written in the EEPROM 302 as correction data in advance, and the focus displaced amount is corrected by following steps of the flowchart shown in FIG. 28 for focusing during shooting.

Figure 28:
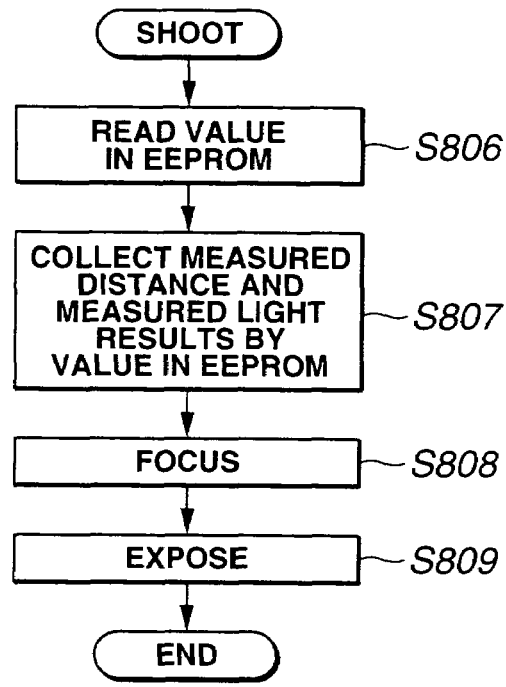

FIG. 28 is a flowchart showing an operational flow for correcting an error during shooting due to the error during the production of a camera by using correction data written in the EEPROM.

When the release switch 313 is turned ON and the shooting is started, a distance measurement result and a light measurement result are calculated in the IC 303a. Then, the CPU 301 reads correction data written in the EEPROM 302 (S806). The correction data is gaps, such as the error A, from design values of the circuits and/or elements, which are written in the EEPROM 302 in advance during the production of the camera. The method for adjusting the correction data will be described later.

After the correction data written in the EEPROM 302 is read, the distance measurement result and the light measurement result are corrected by using the read correction data (S807). Then, the focusing (S808) and the exposure (S809) are performed based on the corrected distance measurement result and the light measurement result.

Figure 27B:
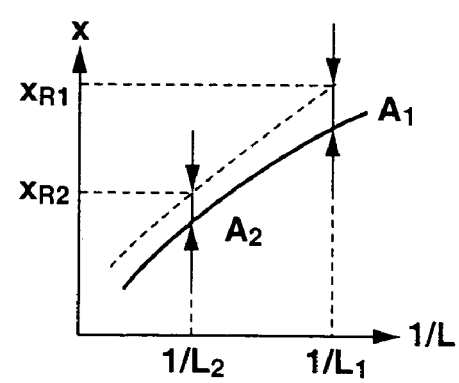
FIG. 27B is a diagram showing a relationship between an incident position of reflection signal light from a subject and a subject distance for correcting also an error due to the nonlinear characteristic.

In a camera requiring more highly precise focusing than the above-described camera, errors in multiple distances may be written in the EEPROM 302 as correction data in advance for correcting errors due to a nonlinear characteristic between the object distance L and the incident position x due to aberration of the lenses and the like as shown in FIG. 27B. Based on the calculated object distance, the correction method, that is, the value of the correction data to be used for correction is changed.

Figure 29:
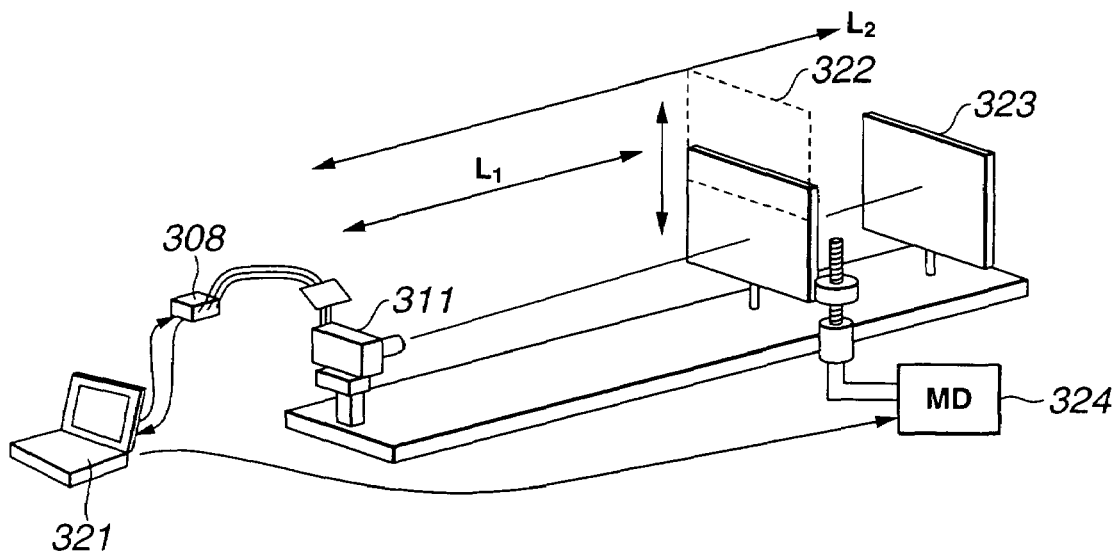
Figure 30:
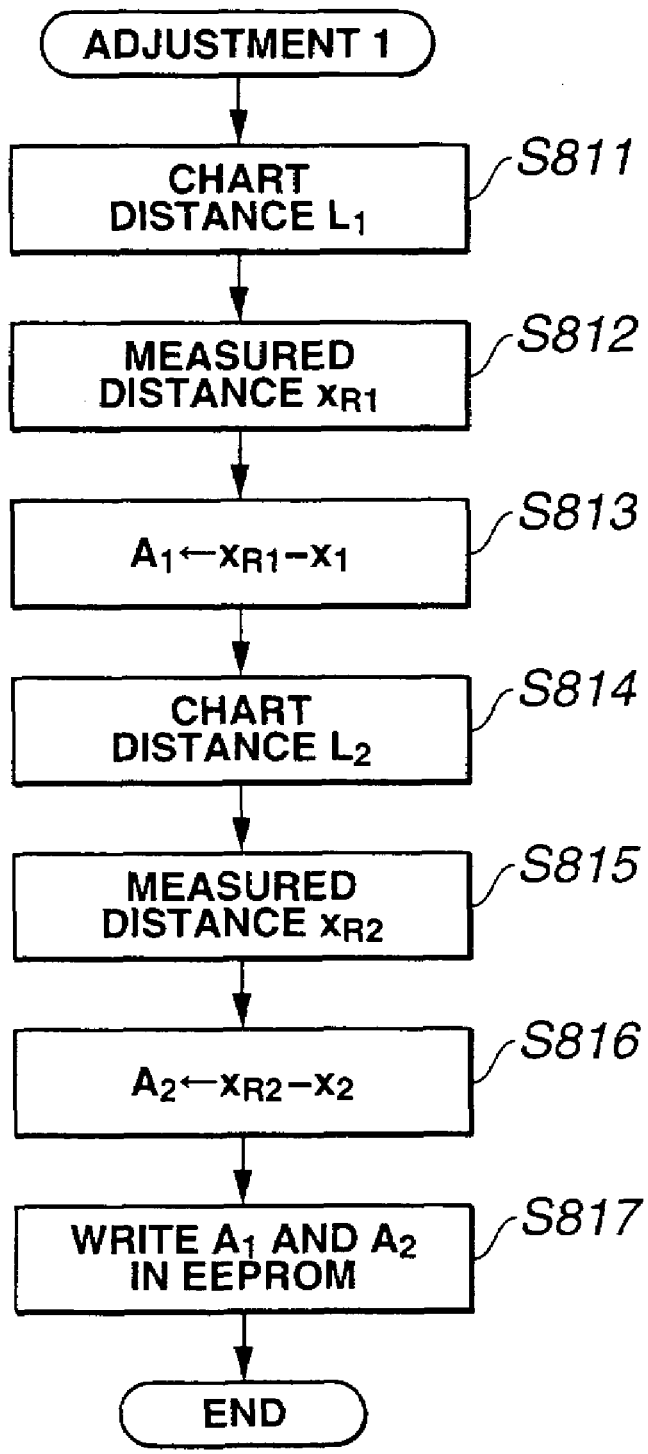

In this way, in order to write correction data for multiple distances in the EEPROM 302, the connecting terminal 307a of the board 310 of the camera 311 in the equipment as shown in FIG. 29 may be connected to the pin 308a of the checker 308. Then, a personal computer 321 controls the camera 311 or a motor driver (called MD hereinafter) for chart switching through the checker 308 to change the distance between the camera 311 and the chart 323 and to obtain a distance measurement result. Then, the error from the design value may be calculated and be written in the EEPROM 302 within the camera 311. The operational flow for the adjustment is shown in FIG. 30.

First of all, the personal computer 321 is operated to move, through the MD 324, the chart 323 such that the distance between the camera 311 and the chart 323 can be $L_1$ in FIG. 29 (S811). Then, the distance measurement circuit 303 is operated from the personal computer 321 through the checker 308 to measure the incident position of signal light reflected from the chart 323. Here, the measured result is $X_{R1}$ (S812). Next, in the personal computer 321, a difference between the incident position (design position) $x_1$ to be measured when the distance between the camera 311 and the chart 323 is $L_1$ and the incident position $X_{R1}$, that is, an error $A_1$ is calculated (S813).

In the same manner, the personal computer 321 is operated to move, through the MD 324, the chart 323 such that the distance between the camera 311 and the chart 323 can be $L_2$ in FIG. 29 (S814). Then, the distance measurement circuit 303 is operated from the personal computer 321 through the checker 308 to measure the incident position of signal light reflected from the chart 323. Here, the measured result is $X_{R2}$ (S815). Next, in the personal computer 321, a difference between the incident position (design value) $x_2$ to be measured when the distance between the camera 311 and the chart 323 is $L_2$ and the incident position $X_{R2}$, that is, an error $A_2$ is calculated (S816).

Then, a command is sent from the personal computer 321 to write the errors $A_1$ and $A_2$ having been calculated by the steps S813 and S816 as correction data in the EEPROM 302 in the camera 311 (S817). The error can be measured not only in the horizontal direction (direction indicated by arrows $L_1$ and $L_2$) in FIG. 29 but also in the vertical direction (direction indicated by an arrow from the chart 323 to the chart 322 indicated by a broken line) in FIG. 29. The number of measured errors is not limited to two apparently.

As described above, the error in the distance measurement result hardly appears as a focus gap. For example, a camera having a short focal distance or a camera having a large F-number tends to focus on all objects, that is, the camera tends to be of the pan focus type, which does not require strict adjustment. Therefore, as shown in FIG. 24D, a camera without error problems during the production can be produced only through manual adjustment based on the distance measurement of the chart 323 having one kind of distance.

Figure 31:
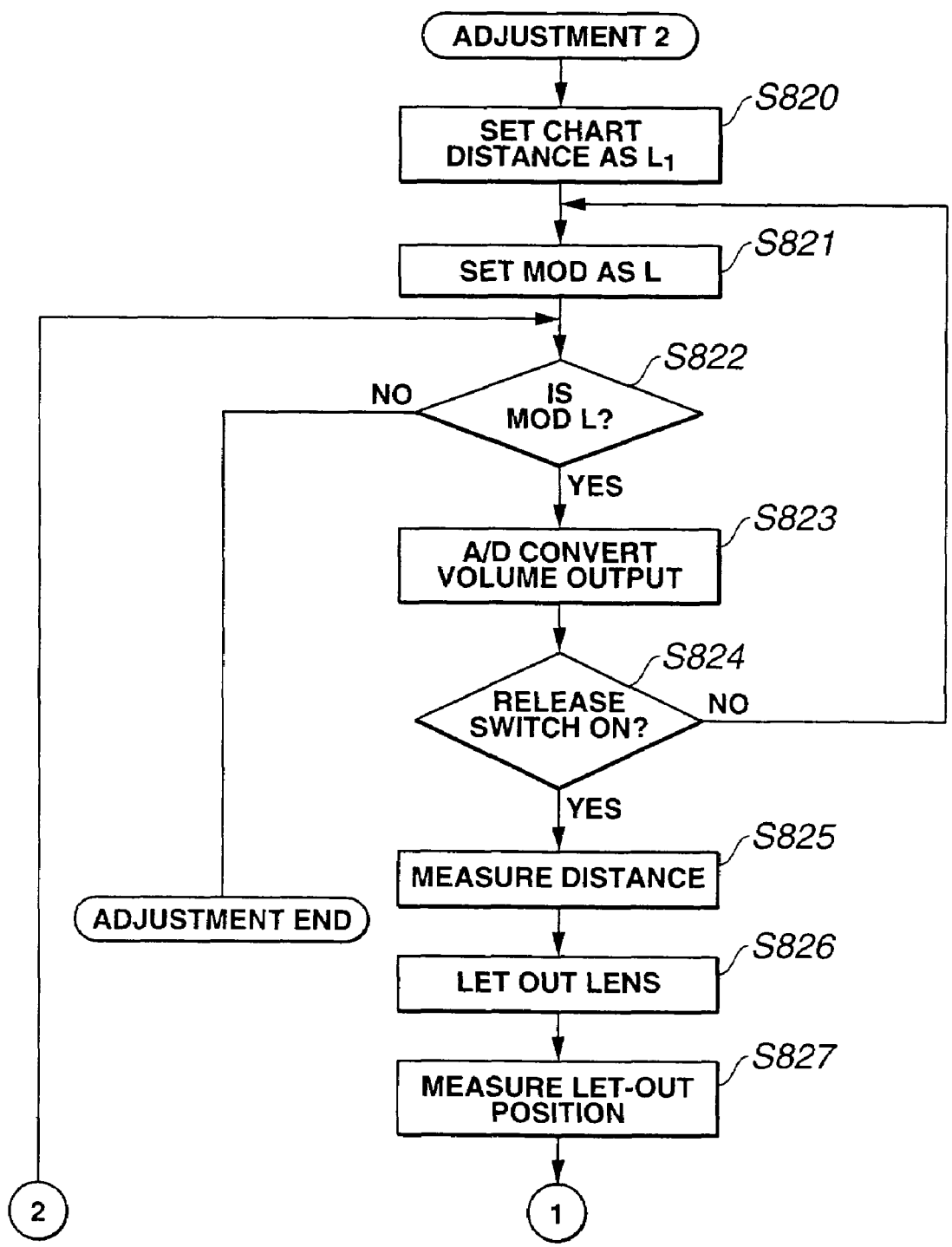
Figure 32:
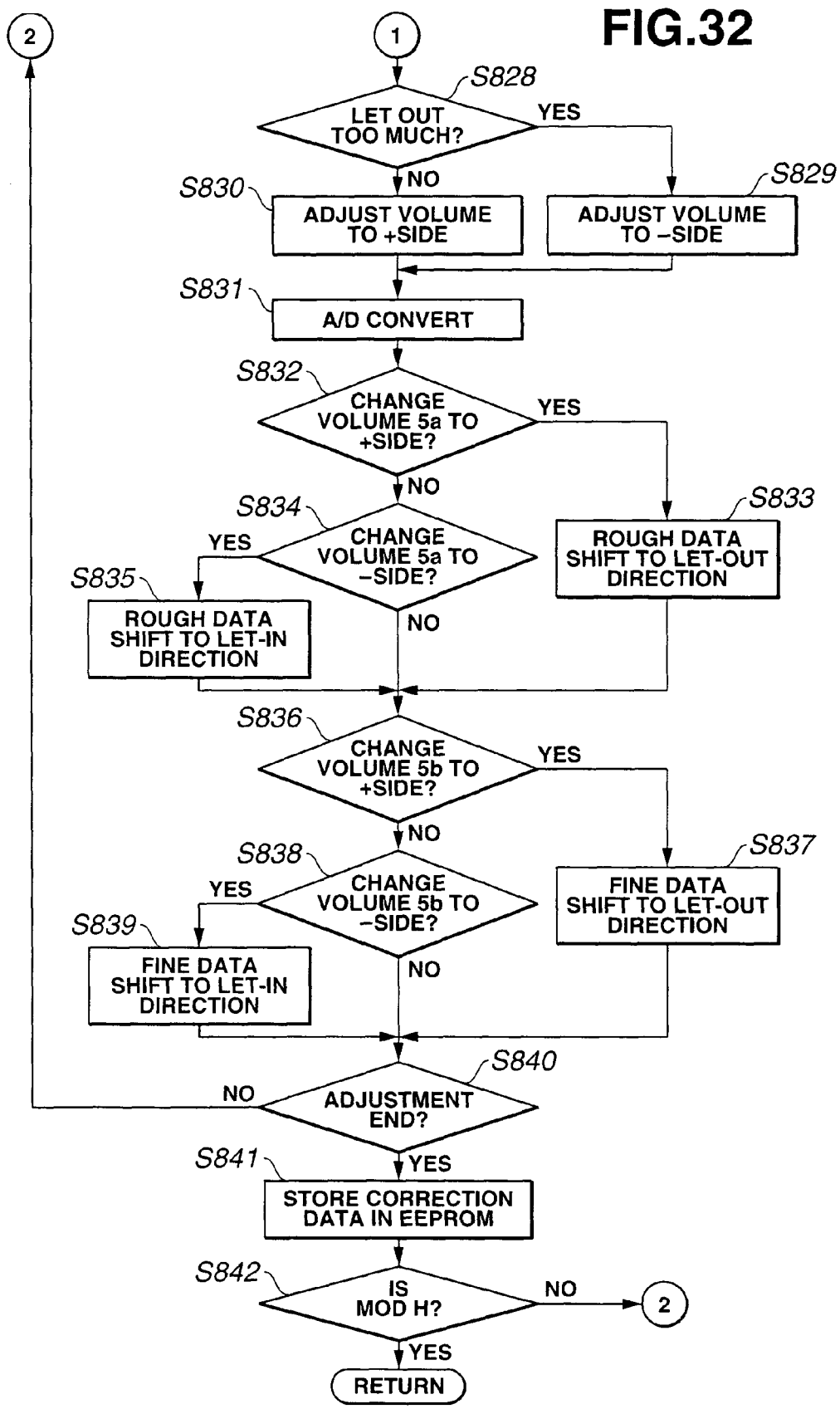

The steps for performing the manual adjustment are shown in FIGS. 31 and 32. In the adjustment method, no complicated apparatus such as the checker 308 and the personal computer 321 are required, and the adjustment can be performed by using the EEPROM 302 without gaps due to changes in temperature, humidity, vibration and so on. The manual adjustment may be used for further slight adjustment on the correction data having been adjusted by the checker 308 after the adjustment using the checker 308 and/or the personal computer 321 is done.

As described above, in view of the problem of the delay of the arrangement of the checker 308 and/or the costs for the introduction of the checker 308, only the manual adjustment may be performed.

The manual adjustment is started by setting a distance between the camera 311b and the chart 323. In other words, an operator sets the position of the chart 323 such that the distance between the camera 311b and the chart 323 can be $L_1$ (S820). After the position of the chart 323 is set, the operator causes the check land 306a, for example, to be shorted on the board 310 so that the potential level of the MOD 301c can be L (S821). The CPU 301 determines the state of the MOD 301c (S822). If the potential level of the MOD 301c is still H, the adjustment mode ends.

On the other hand, if the potential level of the MOD 301c is determined as L, the control in accordance with a sequence program for the manual adjustment mode stored in a ROM in the CPU 301 is started. When the potential level of the MOD 301c is L, that is, when the check land 306a is shorted, the slider of the volume 305a or 305b outputs a potential dividing voltage of the power supply voltage and the GND potential. Therefore, the CPU 301 A/D converts and reads it through the A/D 301a or 301b (S823). Then, the initial state of the volume 305a or 305b is stored in a RAM, not shown, in the CPU 301. Here, the correction data is read from the EEPROM 302 and is stored in the RAM.

After that, the operator turns on the release switch 313. The CPU 301 determines whether the release switch 313 has been turned on or not based on the state of the release switch 313 (S824). When the release switch 313 is still OFF, the processing returns to the step S821. On the other hand, if the release switch 313 has been turned ON, the CPU 301 operates the distance measurement circuit 303 to perform a distance measurement shown in FIG. 26 (S825), and controls to let out the shooting lens 314 in accordance with the distance measurement result (S826).

During the distance measurement, the error in the distance measurement is corrected by using correction data stored in the RAM. When the distance to the chart 323 in the distance $L_1$ is measured, the let-out amount of the shooting lens 314 is determined as the design value in advance. Therefore, the operator can determine whether the AF is performed properly by measuring the lens let-out position (S827).

Therefore, the operator determines whether the lens let-out position is a proper position or not. If the lens let-out position is proper, the soldering is removed from the check land 306*a*. If not, the adjustment operation is performed by leaving the check land 306*a* being shorted. p If the lens let-out position is not the proper position, the operator can determine the amount of displacement of the shooting lens 314 from the design value based on the measured lens let-out position (S828). If the shooting lens 314 is let out too much, the volume 305*a* or 305*b* is adjusted to the –side (S829). If the let-out amount of the shooting lens 314 is not enough, the volume 305*a* or 305*b* is adjusted to the +side (S830). The check of the lens let-out position and the adjustment of the volume 305*a* or 305*b* are performed by the operator visually and manually. Here, by operating the volume 305*a*, the rough adjustment is performed for a large amount of change in correction data. By manipulating the volume 305*b*, the detail adjustment can be performed for a small amount of change in correction data. By using the adjustment of the two volumes differently, the adjustment can be performed further in depth.

The CPU 301 A/D converts and reads the result of the adjustment by the volume 305*a* or 305*b* (S831). Next, whether the volume 305*a* has been changed from the initial state to the +side or not is determined (S832). If the volume 305*a* has been changed to the +side, the correction data stored in the RAM is read out. Then, the data is shifted largely in a direction for letting out the shooting lens 314 (S833). After the data is stored in the RAM, the processing goes to a step S836.

On the other hand, in the determination at the step S832, if the volume 305*a* has not been changed to the +side, whether the volume 305*a* has been changed from the initial state to the –side or not is determined (S834). If the volume 305*a* has been changed to the –side, the correction data stored in the RAM is read. Then, the data is shifted largely in a direction for letting in the shooting lens 314 (S835). After the data is stored in the RAM, the processing goes to a step S836.

Next, whether the volume 305*b* has been changed from the initial state to the +side or not is determined (S836). If the volume 305*b* has been changed to the +side, the correction data stored in the RAM is read. Then, the data is shifted small in the direction for letting out the shooting lens 314 (S837). After the data is stored in the RAM, the processing returns to the step S822.

On the other hand, in the determination at the step S836, if the volume 305*b* has not been changed to the +side, whether the volume 305*b* has been changed from the initial state to the –side or not is determined (S838). If the volume 305*a* has been changed to the –side, the correction data stored in the RAM is read. Then, the data is shifted small in the direction for letting in the shooting lens 314 (S839). After the data is stored in the RAM, the processing goes to a step S840.

In the determination at the step S838, if the volume 305*b* has not been changed to the –side, the correction data is not shifted, and the processing goes to the step S840.

In this way, the adjustment is repeated based on the distance measurement and the lens let-out position in accordance with the distance measurement result. Then, when a desired lens let-out position is obtained, whether the adjustment ends or not is determined (S840). If not, the processing returns to the step S822. If so, the correction data recorded in the RAM is written into the EEPROM 302 (S841). After the writing, the operator removes the soldering from the check land 306*a*. Thus, the potential level of the MOD 301*c* changes from L to H. Then, the CPU 301 determines that the potential level of the MOD 301*c* is H at the step S822 (S842), the manual adjustment mode ends. If the potential level is not H, the processing returns to the step S822.

Next, differences between the normal shooting mode (shooting sequence) and the adjustment mode (adjustment sequence) of the camera according to this embodiment will be described with reference to FIG. 33.

Figure 33:
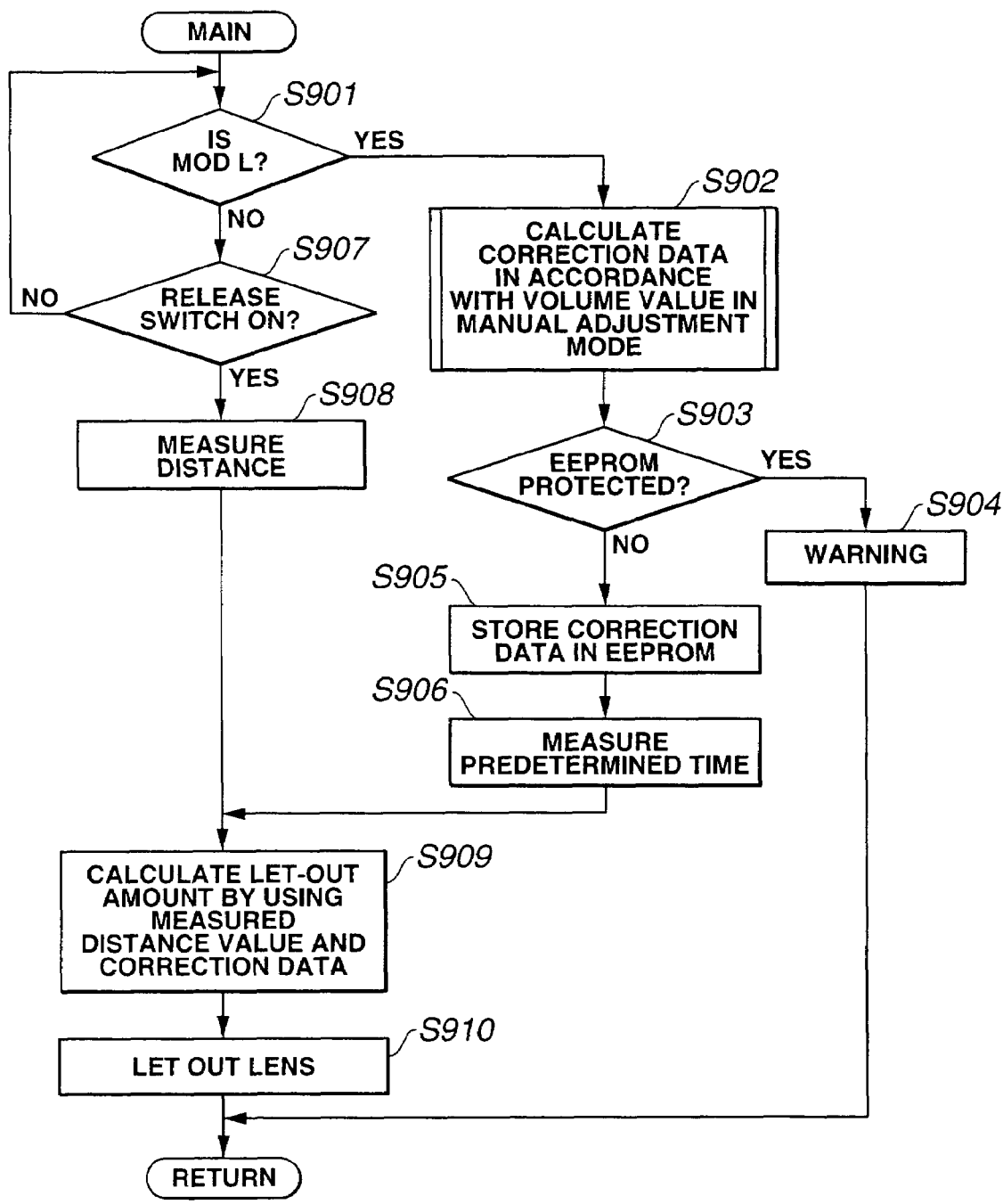

FIG. 33 is a flowchart for explaining a main operation of the camera according to this embodiment.

Upon powering on the camera, the CPU 301 starts an operation in the flowchart and determines whether the potential level of the MOD 301*c* is L or not, that is, whether the camera is in the manual adjustment mode or not (S901).

If the potential level of the MOD 301*c* is L, the control in the above-described manual adjustment mode is performed excluding the writing processing to the EEPROM 302, and the correction data in accordance with the manipulated amount of the volume 305*a* or 305*b* is calculated (S902). Next, the result is stored in the EEPROM 302. Here, when the board 310 has any abnormality such as a failure, the protective terminal 302*a* of the EEPROM 302 is protected as described above. Then, the CPU 301 determines whether the EEPROM 302 is protected or not (S903). If the EEPROM 302 is protected, the fact that the EEPROM 302 is protected in the adjustment mode in which the protection should be cleared, that is, the fact that the board 310 has an abnormality is warned (S904). Then, the operation in the flowchart ends. On the other hand, if the EEPROM 302 is not protected, the correction data having been calculated by the step S902 is written in the EEPROM 302 (S905). After a predetermined period of time has been measured (S906), the processing goes to a step S909. The determination of whether the EEPROM 302 is protected or not at the step S903 is performed in reality by determining whether the correction data has been written in the EEPROM 302 properly.

On the other hand, in the determination of the step S901, if the potential level of the MOD 301*c* is not L, the control is performed for the normal shooting mode. First of all, the CPU 301 determines whether the release switch 313 has been turned on or not (S907). If the release switch 313 has not been turned on, the processing returns to the step S901. In the determination at the step S907, if the release switch 313 has been turned on, the distance measurement is performed by the distance measurement circuit 303 (S908). Then, the processing goes to a step S909.

After the above-described operation, a let-out amount of the shooting lens 314 is calculated (S909). After the shooting lens 314 is let out in accordance with the calculated let-out amount (S910), the exposure is performed. Then, the operation in the flowchart ends.

As described above, according to this embodiment, current is not fed to the volume all the times except for during the manual adjustment. Thus, the energy can be saved. Furthermore, by feeding current to the volume, the volume adjustment and the L-input to the adjustment mode setting input terminal can be performed at the same time. Then, the manual adjustment mode can be obtained easily. Thus, the work efficiency can be increased. Furthermore, by measuring a predetermined period of time after the manual adjustment mode, the time from the release to the lens letting-out is differentiated between the case where the lens is let out after the manual adjustment mode and the case where the lens is let out in the normal mode. Thus, the operator for the adjustment work can properly recognize that the camera is in the adjustment mode at that time.

The value of the volume may be any resistive value. This is because the adjustment is performed by detecting, in the CPU, the change in voltage of the volume before and after the adjustment according to this embodiment. Therefore, the part for the volume can be selected easily.

Furthermore, since the correction data is written in the EEPROM at all times except for the time for the adjustment, as described above, the performance of the camera does not change even when the adjusted position of the volume is displaced due to vibration or environmental change. Therefore, a camera having a stable performance can be provided.

For example, when the same board is mass-produced, for example, an automatic adjustment is performed thereon by using the checker first of all. Then, each of the cameras is adjusted manually by using multiple volumes. In this way, two kinds of adjustment methods may be used together so as to improve the precision of the adjustment.

Furthermore, the two volumes are provided for data-shifting by different amounts in accordance with the manipulated amounts of the volumes. Thus, both of the rough adjustment and the detail adjustment can be used, which can improve the efficiency of the adjustment. While only two volumes are provided in this embodiment, the number of volumes is not limited to two.

Sixth Embodiment

A sixth embodiment of the invention will be described with reference to FIGS. 34A and 34B. The sixth embodiment can perform multiple kinds of adjustment by using one volume.

FIG. 34A is a construction diagram relating to a printed circuit board for an electronic circuit of a camera according to the sixth embodiment. One end of a volume 305 is connected to a power supply like the fifth embodiment. The other end of the volume 305 is connected to the anode side of an LED 305$c$. The cathode side of the LED 305$c$ is connected to an output terminal (open drain) of the CPU 301. An A/D 301$a$ in a CPU 301 is connected to the volume 305 through a slider so that the potential dividing voltage of the volume 305 can be A/D converted.

In this embodiment, two input terminals (MOD 301$c$ and MOD 301$d$) for adjustment mode setting are provided in the CPU 301. The MOD 301$c$ can be grounded through a switch C1 while the MOD 301$d$ can be grounded through a switch C2. Furthermore, the EEPROM 302 is connected to the CPU 301. The other construction is the same as that of the fifth embodiment, and the description will be omitted here.

In this circuit, when at least one of the switches C1 and C2 is turned on and when one of the MOD 301$c$ and the MOD 301$d$ is L, the CPU 301 turns the cathode side of the LED 305$c$ to L to cause voltage in the volume 305. Furthermore, the LED 305$c$ is caused to emit light. By looking at the light emitted by the LED 305$c$, an operator can recognize that the CPU 301 enters into the manual adjustment mode and can start to work securely.

In this embodiment, multiple kinds of adjustment mode can be selected by combining ON/OFF of the switches C1 and C2. By combining the ON/OFF of the switches C1 and C2, the rough adjustment and detail adjustment can be switched on a volume as described in the fifth embodiment.

The circuit having this kind of construction is implemented on a board 310 as shown in FIG. 34B. The shaded part is a conduction pattern of the board 310. For example, a metal clip 306$b$ may be used to short across two parts of the conduction pattern, which can be alternatives for the switches C1 and C2 as shown in FIG. 34A. In other words, no special apparatus are required during the operation.

Furthermore, the operator in FIG. 24D may adjust correction data by changing the distance between the camera 311$b$ and the chart 323 every time the place catched by the metal clip 306$b$ is changed. Thus, as described with reference to FIG. 27B, the precise AF adjustment can be performed manually even when a nonlinear characteristic occurs between an object distance L and an incident position x.

In order to adjust correction data in the example having the nonlinear characteristic in FIG. 27B, the distance between the camera 311$b$ and the chart 323 is set to $L_1$ first of all. Then, the metal clip 306$b$ is used to short a conduction pattern c1 in FIG. 34B. Then, the release switch 313 is turned on, and the distance measurement is performed by the distance measurement circuit 303.

Next, the distance between the camera 311$b$ and the chart 323 is set to $L_2$. Then, the metal clip 306$b$ is used to short a conduction pattern c2 in FIG. 34B. Then, by performing the release operation, the distance measurement is performed by the distance measurement circuit 303. Then, the gaps between the distance measurement results and the design value may be written in the EEPROM 302.

In this way, by shorting the conductive patterns c1 and c2 on the board 310 by using he metal clip 306$b$, the CPU 301 can recognize which distance is used for adjustment. Then, the CPU 301 can calculate a difference between a distance measurement result and a design value and can write correction data properly in the EEPROM 302.

Another adjustment mode may be entered by shorting both of the conduction patterns c1 and c2. Alternatively, by devising timing of the lighting-up of the LED 305$c$, the current adjustment mode can be informed to the operator. Alternatively, the rough adjustment and detail adjustment of the volume may be switched.

As described above, according to this embodiment, multiple kinds of adjustment can be switched easily by switching combinations of switches. Furthermore, by displaying an adjusted state by an LED, the operator can recognize the current adjustment mode easily and can perform more stable operations. Furthermore, by achieving commonality between the terminal for the LED display and the terminal for the volume, the terminals of the CPU can be saved.

Seventh Embodiment

A seventh embodiment of the invention will be described with reference to FIGS. 35A to 37. While the fifth and sixth embodiments mainly relate to AF adjustment of a compact camera, the seventh embodiment relates to adjustment of exposure control (AE) circuit of a single-lens reflex camera. The seventh embodiment is particularly an example where variations in sensitivity and mounting position of photoreceptive elements and a variation capacity of an integration capacitor are corrected by using correction data in an EEPROM.

Figure 35A:
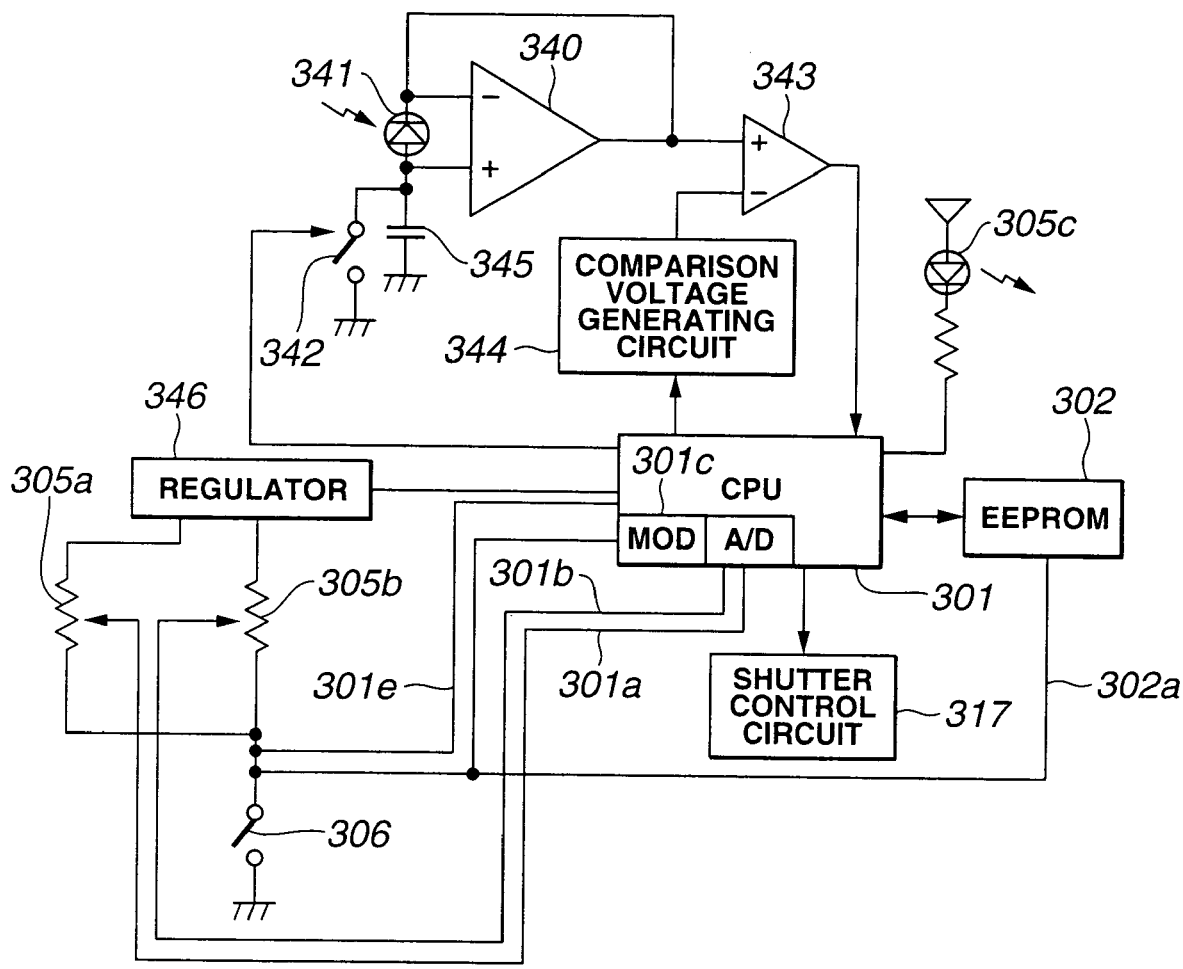
FIG. 35A is a block circuit diagram showing an electric construction relating to an exposure control circuit of a camera according to a seventh embodiment of the invention.

FIG. 35A shows an electric circuit construction including the AE circuit of the camera according to this embodiment. Light from an object is received by a photodiode 341, and the photodiode 341 outputs current in accordance with the amount of the received light. A switch 342 is turned on once under control of a CPU 301 when an integration starts. The charges in the integration capacitor 345 are discharged and are initialized before the integration.

After the initialization of the charges, light current output from the photodiode 341 is integrated by an integration amplifier 340 and the integration capacitor 345. A comparator 343 is used for determining the end of the integration.

The comparator 343 compares a comparative voltage generated by a comparative-voltage generating circuit 344 and the voltage output from the integration amplifier 340, and the integration ends when both of them are equal. The CPU 301 controls the switch 342 and/or the comparative-voltage generating circuit 344 to control the start and end of the integration. After the end of the integration, the CPU 301 controls the shutter control circuit 317 to control a shutter.

Also in this circuit, the voltage of the comparative-voltage generating circuit 344 may be replaced by the voltage by correction data in the EEPROM 302. Thus, the variations can be corrected, and the proper exposure control can be performed. For the adjustment for the correction, the voltage generated by a regulator 346 is divided by two volumes 305a and 305b and is A/D converted by A/D 301a and 301b in the CPU 301. By determining the A/D converted voltage in the CPU 301, the adjusted direction of the volume 305a or 305b can be detected. The voltage of the comparative-voltage generating circuit 344 may be determined in accordance with the voltage of the detected volume 305a or 305b.

For the manual adjustment mode, like the fifth embodiment, the switch 306 or a check land 306a and an MOD 301c are provided. The MOD 301c is grounded through the switch 306, and current is fed to the volume 305a or 305b. Then, the voltage caused in the volume 305a or 305b is read by the A/D 301a or 301b. When the CPU 301 detects that the potential level of the MOD 301c is L for a predetermined time or more, the CPU 301 starts to control in accordance with a program for the manual adjustment mode stored in a ROM, not shown, in the CPU 301. The operation of a protective terminal 302a is the same as that of the fifth embodiment. Correction data can be written in the EEPROM 302 in response to the start of the manual adjustment mode.

Figure 35B:
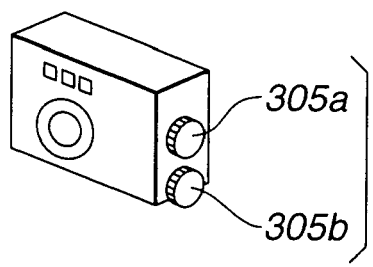
FIG. 35B is a diagram showing an example of an external appearance of a camera.

In this embodiment, the CPU 301 can control the potential level of an output terminal 301e. The CPU 301 may keep the potential level of the output terminal 301e at L for a sufficiently shorter time than the time for the detection of the manual adjustment mode so that the output voltage of the volume 305a or 305b can be read. Therefore, even when the switch 306 is OFF (not in the manual adjustment mode), the volumes can be manipulated by dials, for example, on the exterior of the camera as shown in FIG. 35B. For example, the volume 305a can be also used as a switch for switching the shooting mode of the camera while the volume 305b can be also used as a switch for adjusting an amount of correction during the exposure.

Figure 36B:
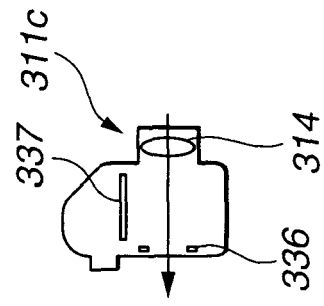
FIG. 36B is a diagram for explaining a state where a focal plain shutter is open after a mirror withdraws from an optical path upon shooting by using this kind of camera.
Figure 36A:
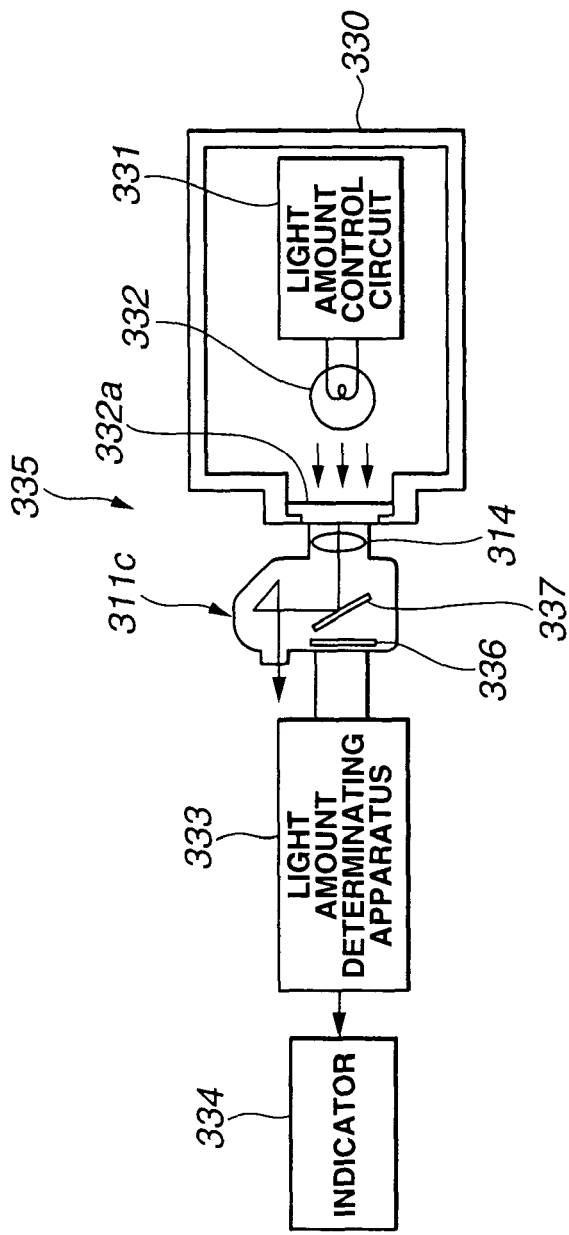
FIG. 36A is a diagram for explaining a state where an AE circuit of the camera according to the seventh embodiment is adjusted by an adjuster.

FIG. 36A illustrates a state where the AE circuit of the camera according to this embodiment is adjusted by an adjuster 335 including a brightness box 330, a light amount determination apparatus 333 and an indicator 334.

The brightness box 330 has a light amount control circuit 331 for controlling the light of a lamp 332 to have a predetermined brightness. Light is diffused by a diffusion plate 332a and enters to a shooting lens 314 of the camera 311c. The camera 311c is illustrated as a single-lens reflex camera, which can observe the light entering from shooting lens 314 by using a finder optical system including a mirror 337 and a pentaprism.

During the shooting by this kind of camera, after the mirror 337 withdraws from the optical path as shown in FIG. 36B, a focal plane shutter (shutter) 336 opens. Then, after the exposure, the mirror 337 returns to the state as shown in FIG. 36A again. During the adjustment, light with a predetermined brightness is controlled by the light amount control circuit 331 to enter to the shooting lens 314. Then, the light enters to the light amount determination apparatus 333 through the shutter 336. When the light with the predetermined brightness enters, the light amount determination apparatus 333 determines whether the exposure is performed by a proper light amount or not. Then, the result is indicated by the indicator 334.

Next, an operational flow for manually adjusting the AE circuit of the camera according to this embodiment will be described with reference to FIG. 37.

An operator adjusts the inside of the brightness box 330 to a predetermined brightness, that is, to a design value first of all (S951). Next, the operator turns on the switch 306 and turns the potential level of the MOD 301c to L (S952).

After the operation, the camera 311c enters to the manual adjustment mode. First of all, the CPU 301 turns on the regulator 346 (S953). Then, the CPU 301 applies positive voltage to the volume 305a and 305b. Next, after the voltage divided by the slider is read by the A/D 301a and 301b (S954), whether the read voltage is at a predetermined level or not is determined (S955). If at least one of the A/D 301a and the A/D 301b is not at the predetermined level, the warning of the fact is indicated (S956).

The warning is indicated by causing the LED 305c on the board to emit light like the sixth embodiment. A warning sound may be output instead of the warning indication. When the operator looks the indication, the operator returns the volumes 305a and 305b to predetermined positions. After the volumes 305a and 305b are returned to the predetermined positions (S957), the processing returns to the step S953.

On the other hand, in the determination by the step S955, if the voltages of both of the read volumes 305a and 305b are at the predetermined levels, the CPU 301 determines the state of the release switch 313 and determines whether a release operation has been performed or not (S958). The release switch can be pressed at two levels. When the release switch is pressed half, a 1st release switch is turned on and the distance measurement and light measurement operations are performed. If the release switch is pressed entirely, a 2nd release switch is turned on, and the exposure is performed. The release operation here is the operation for pressing the release button entirely in order to turn on the 2nd release switch. If the release operation is not performed, the processing returns to the step S953.

On the other hand, when the release operation is performed, a release sequence is performed. Then, the AE circuit performs shutter control in accordance with the current states of the volumes 305a and 305b (S959). The operator switches the volume 305a or 305b in accordance with the current shutter speed (S960). Here, when the volume 305a is switched, the change amount of the correction data is controlled to be larger. When the volume 305b is switched, the change amount of the correction data is controlled to be smaller. Therefore, the rough adjustment and detail adjustment of the correction data can be switched.

The volumes 305a and 305b are switched such that the shutter speed during the adjustment can be a predetermined value $T_0$. In other words, when the shutter speed is longer than $T_0$, the voltage of the comparative-voltage generating circuit 344 is decreased in accordance therewith. Then, the close operation of the shutter 336 is performed under a condition where the integration voltage is low. As a result, the shutter speed can be increased. In order to detect the shutter speed, a predetermined amount of light having been controlled by the light amount control circuit 331 is exposed, and the exposed light amount is determined by the light amount determination apparatus 333. The result from the light amount determination apparatus 333 is indicated by the indicator 334. Here, when the shutter speed changes, the value of the exposure amount also changes. Therefore, by calculating the relationship among the incident light, the shutter speed and the exposed light amount in advance, and by detecting the exposed light amount by the light amount determination apparatus 333, the shutter speed can be adjusted.

When the volume 305*a* or 305*b* is adjusted, the CPU 301 reads correction data written in the EEPROM 302 into a RAM, not shown (S961). Next, the divided voltage of the volume 305*a* or 305*b* is read to the RAM in the CPU 301 (S962). Then, the correction data having read into the RAM is changed based on the read result of the volume 305*a* or 305*b* (S963). Next, after a predetermined period of time is measured (S964), the fact that the camera is in the adjustment mode currently is announced by, for example, indication (S965). Thus, an operator or a user can easily recognize that the camera is in the adjustment mode from the release timing or indication.

Next, the shutter control is performed again (S966). Thus, whether the shutter speed having been corrected based on the correction data is the proper shutter speed or not can be checked. After the operator checks that the shutter speed is a predetermined value, the value of the correction data stored in the RAM is written into the EEPROM 302 (S967). Then, the switch 306 is manipulated to switch the potential level of the MOD 301*c* from L to H.

Next, the CPU 301 determines whether the manual adjustment mode ends or not, that is, whether the potential level of the MOD 301*c* is H or not (S968). If the manual adjustment mode has not ended, that is, if the potential level of the MOD 301*c* is L, the processing returns to the step S953. If the potential level of the MOD 301*c* is H, the operation in the flowchart ends.

As described above, according to this embodiment, the light measurement adjustment of the camera can be easily performed by using a general shutter speed tester, brightness box and driver. Therefore, the camera, which can be manufactured and be repaired even in a place without a checker, can be provided.

Eighth Embodiment

An eighth embodiment of the invention will be described with reference to FIGS. 38 and 39. In the seventh embodiment, the dial type operating member can be used both as a shooting mode switching switch and a volume. However, a pressing-type operating member is more used recently as the shooting mode switching switch than the dial-type operating member. Therefore, in the eighth embodiment, the adjustment of correction data is performed by manipulating a pressing-type operating member without using a volume.

Figure 38:
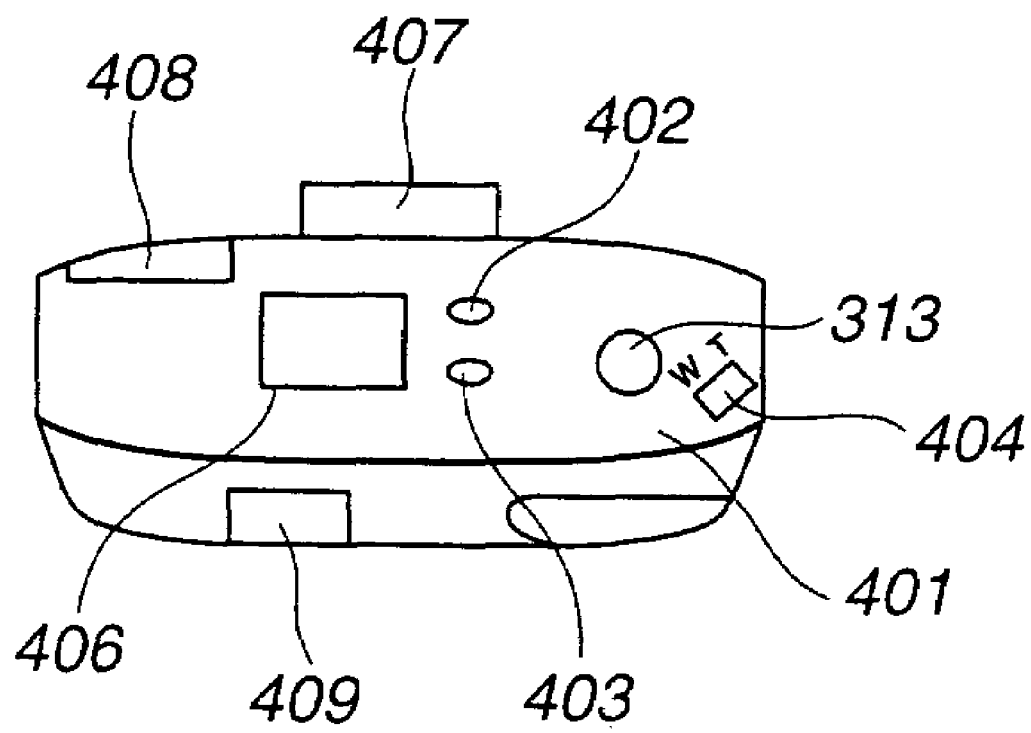
FIG. 38 is a top external appearance diagram of a camera according to an eighth embodiment of the invention.

FIG. 38 is a top external appearance diagram of a camera according to this embodiment. In other words, a self timer switch 402 for switching a self timer mode and a strobe switch 403 for switching a strobe mode for emitting or inhibiting strobe light near an LCD 406 for display on the top surface of a camera 401.

A zoom switch 404 for zooming by the camera and a release button 313 are provided on the top surface of the camera. The release button 313 is a button interlocking with the release switch. The shooting lens 407 and a strobe light emitting portion 408 are provided on the front surface of the camera. An eyepiece window 409 for a finder is provided on the back surface of the camera.

As described above, the camera according to this embodiment does not have a volume. Instead, the correction data can be adjusted slightly based on the manipulation state of the switches.

The adjustment of correction data according to this embodiment will be described with reference to FIG. 39. The switches used instead of the volume are the self-timer switch 402, the strobe switch 403 and the zoom switch 404 according to this embodiment.

Here, the roles of the switches in the manual adjustment mode will be described. The self-timer switch 402 is a switch for adjusting correction data roughly instead of the volume 305*a*. The strobe switch 403 is a switch for adjusting correction data in detail instead of the volume 305*b*. The zoom switch 404 is a switch for determining a direction for adjusting correction data. Apparently, the roles of these switches may be switched, and/or the role of the correction data adjustment may be assigned to another switch.

In order to turn the camera into the manual adjustment mode, like the above-described embodiment, the state of the switch 306 or the check land 306*a* implemented on the board 310 in the camera, that is, the potential level of the MOD 301*c* is determined.

Figure 39:
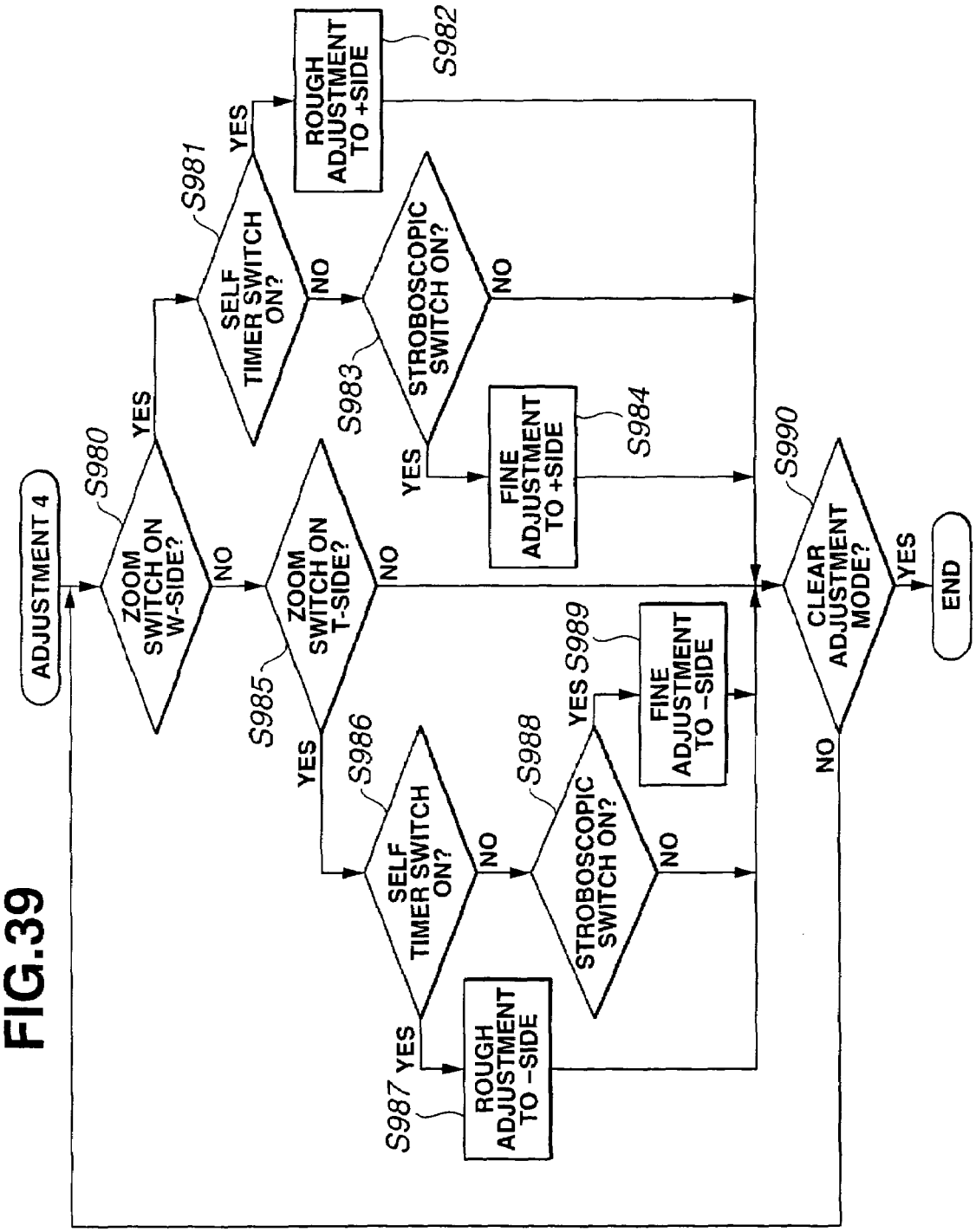
FIG. 39 is a flowchart for explaining a flow of an operation for manual correct data adjustment of the camera according to the eighth embodiment.

When the camera is turned into the manual adjustment mode, the operation in the flowchart in FIG. 39 starts. First of all, the CPU 301 determines whether the zoom switch 404 has been manipulated to a wide-angle (W) side or not based on the state of the zoom switch 404 (S980).

If the zoom switch 404 has been manipulated to the W-side, the correction data must be adjusted to the +side. Next, the CPU 301 determines whether the self-timer switch 402 has been turned on or not (S981). If the self-timer switch 402 has been turned on, the correction data is roughly adjusted to the +side (S982), and the processing goes to a step S990. The rough adjustment is for adjusting correction data by a large changed amount at one adjustment operation.

On the other hand, if the self-timer switch 402 has not been turned ON, whether the strobe switch 403 has been turned on or not is determined (S983). If the strobe switch 403 is turned on, the correction data is adjusted in detail to the +side (S984), and the processing goes to a step S990. The detail adjustment is for adjusting correction data by a small changed amount at one adjustment operation. On the other hand, if the strobe switch 403 has not been turned on either, the correction data is not adjusted. Then, the processing goes to a step S990.

If the zoom switch 404 has not been manipulated to the W-side, whether or not the zoom switch 404 is manipulated to telephoto (T) side is determined (S985). If the zoom switch 404 has been manipulated to the T-side, the correction data must be adjusted to the −side. Next, the CPU 301 determines whether the self-timer switch 402 has been turned on or not (S986). If the self-timer switch 402 has been turned on, the correction data is roughly adjusted to the −side (S987), and the processing goes to a step S990.

On the other hand, if the self timer switch 402 has not been turned ON in the determination at the step S986, whether the strobe switch 403 has been turned on or not is determined (S988). If the strobe switch 403 is turned on, the correction data is adjusted in detail to the −side (S989), and the processing goes to a step S990. On the other hand, if the strobe switch 403 has not been turned on either, the correction data is not adjusted. Then, the processing goes to a step S990. The detail adjustment is for adjusting correction data by a small changed amount at one adjustment operation.

Next, the CPU 301 determines whether the potential level of the MOD 301*c* is H or not, that is, whether the adjustment mode is cleared or not based on the state of the MOD 301c (S990). If the adjustment mode is not cleared, the processing returns to the step S980. If the adjustment mode is cleared, the operation in the flowchart ends.

Thus, even by using the pressing-type switch having only two states of ON and OFF, correction data can be adjusted in detail.

Here, a case where exposure correction is performed will be described as an example. In this case, data can be changed roughly by 0.5 EV every time the self-timer switch 402 is turned on once. Data can be changed small by 0.1 EV every time the strobe switch 403 is turned on once. Apparently, these adjustment values are not limited to those values in this example.

For example, when an error is +0.8, the zoom switch 404 is manipulated to the T-side. Then, by manipulating the self-timer switch once and the strobe switch three times, the correction of −(0.5×1+0.1×3)=−0.8 EV can be performed.

Apparently, this result may be displayed on the LCD 406 for display.

As described above, according to this embodiment, correction data can be adjusted by using a pressing-type switch instead of a volume.

The invention has been described above based on the embodiments. However, the invention is not limited to the embodiments, and various changes and applications thereof can be apparently made within the scope of the principle of the invention.

As described in detail, according to the fifth to eighth embodiments, a camera can be provided in which a special mode for causing the camera itself to adjust is provided so that the camera can be adjusted without requiring a checker.

Furthermore, by linking the state of writing into an EEPROM and the operational mode of a camera, the data in the EEPROM is not changed at all times other than the adjustment mode. Thus, correction data is not changed mistakenly during shipment and/or during shooting.

Furthermore, an operator can select one for adjustment, either an adjustment method requiring a checker or an adjustment method without requiring a checker. Therefore, a camera, which allows the reduction of costs for the checker adoption and highly precise shooting control at the same time, can be produced. Furthermore, by using, in a camera according to the invention, both of the volume adjustment and the automatic adjustment using a checker, errors caused during mass production can be adjusted more highly precisely.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A camera comprising:
    a shooting optical unit; and
    a focusing system for moving a focal position of the shooting optical unit by a predetermined positional interval, for obtaining an image pickup signal at each focal position, and for detecting a focus position based on contrast values of the obtained image pickup signals,
    wherein the focusing system comprises:
        a control unit for, when an instruction is given to detect a position at infinity, controlling the focusing system to perform a plurality of times a process comprising: performing said moving and said obtaining to position the focal position of the shooting optical unit at a plurality of positions at the predetermined positional interval in a range where the position at infinity is expected to be included, and to obtain an image pickup signal at each of the positions at which the focal position of the shooting optical unit is positioned;
        a filter unit comprising a first filter for normal position detection and a second filter for infinity position detection having a frequency characteristic different from a frequency characteristic of the first filter, wherein when the instruction is given to detect the position at infinity, the filter unit performs frequency filtering processing on the obtained image signals using the second filter; and
        a focus position detecting unit for detecting the focus position based on the contrast values of the obtained image pickup signals;
    wherein, when the instruction is given to detect the position at infinity, the focus position detecting unit detects, for each time that said process is performed, a provisional focus value based on the contrast values of the obtained image pickup signals which have undergone the frequency filtering processing using the second filter, so as to obtain a plurality of provisional focus values, and the focus position detecting unit detects a final focus position based on the plurality provisional focus values.

2. The camera according to claim 1, further comprising a memory unit for storing the final focus position at infinity detected by the focusing system as a focus value of the position at infinity.

3. The camera according to claim 2, wherein the shooting optical unit includes a zoom optical unit, and the memory unit stores the focus value of the position at infinity together with a focal distance set when the final focus position of the position at infinity is detected.

4. The camera according to claim 1, wherein the focus position detecting unit detects the final focus position by averaging the provisional focus values.

5. The camera according to claim 1, wherein the respective frequency characteristics of the second filter and the first filter are set such that the second filter passes a high frequency component of the image pickup signals more than the first filter.

6. The camera according to claim 1, wherein the predetermined positional interval by which the focusing system moves the focal position of the shooting optical unit is smaller when the instruction is given to detect the position at infinity than when an instruction is given to perform normal position detection.

7. A focus position detecting method comprising:
    when an instruction is given to detect a position at infinity, performing steps comprising:
    selecting a second frequency filter processing which passes a high frequency component of an image pickup signal more than a first frequency filter processing for normal position detection, as a frequency filter processing to be performed on an image pickup signal;
    performing a plurality of times a process comprising: positioning a focal position at a plurality of positions at a predetermined positional interval in a range where the position at infinity is expected to be included, and obtaining an image pickup signal at each of the positions at which the focal position is positioned;

detecting a provisional focus value based on contrast values of the obtained image pickup signals, after the obtained image pickup signals have undergone the second frequency filter processing, the detection of the provisional focus value being performed for each time that said process is performed so as to obtain a plurality of provisional focus values; and detecting a final focus position from the plurality of provisional focus values.

* * * * *

UNITED STATES PATENT AND TRADEMARK OFFICE
CERTIFICATE OF CORRECTION

PATENT NO.       : 7,319,487 B2  
APPLICATION NO.  : 10/407155  
DATED            : January 15, 2008  
INVENTOR(S)      : Naoki Fujii et al.

Page 1 of 1

It is certified that error appears in the above-identified patent and that said Letters Patent is hereby corrected as shown below:

On the Title page:

Under Item (30) Foreign Application Priority Data, add --May 29, 2002   (JP) ............................. 2002-156087--.

Signed and Sealed this

Thirteenth Day of May, 2008

JON W. DUDAS  
*Director of the United States Patent and Trademark Office*